United States Patent
Hashimoto

(10) Patent No.: US 10,309,510 B2
(45) Date of Patent: Jun. 4, 2019

(54) WORK VEHICLE

(71) Applicant: YANMAR CO., LTD., Osaka-shi, Osaka (JP)

(72) Inventor: Yusuke Hashimoto, Osaka (JP)

(73) Assignee: YANMAR CO., LTD., Osaka (JP)

(*) Notice: Subject to any disclaimer, the term of this patent is extended or adjusted under 35 U.S.C. 154(b) by 59 days.

(21) Appl. No.: 15/493,380

(22) Filed: Apr. 21, 2017

(65) Prior Publication Data

US 2017/0219076 A1 Aug. 3, 2017

Related U.S. Application Data

(63) Continuation of application No. PCT/JP2015/077539, filed on Sep. 29, 2015.

(30) Foreign Application Priority Data

Oct. 22, 2014 (JP) .................................. 2014-215742

(51) Int. Cl.
*F16H 47/04* (2006.01)
*F16H 61/42* (2010.01)
(Continued)

(52) U.S. Cl.
CPC ............. *F16H 47/04* (2013.01); *B60K 17/08* (2013.01); *B60K 17/10* (2013.01); *F16H 3/54* (2013.01);
(Continued)

(58) Field of Classification Search
CPC .. F16H 47/04; F16H 61/42; F16H 2037/0886; B60K 17/10
See application file for complete search history.

(56) References Cited

U.S. PATENT DOCUMENTS 6,358,174 B1 * 3/2002 Folsom .................. F16H 47/04
475/72
2004/0209718 A1 * 10/2004 Ishibashi ............. B60W 10/103
474/18
(Continued)

FOREIGN PATENT DOCUMENTS

CN 102422056 A 4/2012
EP 2325525 A1 5/2011
(Continued)

OTHER PUBLICATIONS

Chinese Office Action dated Sep. 30, 2018 issued in corresponding Chinese Application No. 201580050286.7 cites the patent documents above.

*Primary Examiner* — Edwin A Young
(74) *Attorney, Agent, or Firm* — Norton Rose Fulbright US LLP

(57) ABSTRACT

A transmission case includes: a main transmission input shaft to which the driving force is transmitted from the engine; and a main transmission output shaft fit on the main transmission input shaft in a relatively rotatable manner. The main transmission input shaft is provided with a hydraulic pump unit, a cylinder block, and a fixed capacity hydraulic motor unit, forming a hydraulic mechanical transmission, arranged in series. Shifted driving force is transmitted to the main transmission output shaft via the fixed capacity hydraulic motor unit. The transmission case includes a planetary gear mechanism and a transmission shaft with which the shifted driving force via the main transmission output shaft and the combined driving force via the planetary gear mechanism can be transmitted.

3 Claims, 24 Drawing Sheets

(51) Int. Cl.
*F16H 3/54* (2006.01)
*B60K 17/08* (2006.01)
*B60K 17/10* (2006.01)
*F16H 37/08* (2006.01)

(52) U.S. Cl.
CPC ........ *F16H 61/42* (2013.01); *B60Y 2200/221* (2013.01); *F16H 2037/0886* (2013.01)

(56) References Cited

U.S. PATENT DOCUMENTS

| | | |
|---|---|---|
| 2005/0070390 A1* | 3/2005 | Irikura ................ B60K 17/105 475/23 |
| 2011/0099993 A1 | 5/2011 | Ishii et al. |
| 2011/0166752 A1 | 7/2011 | Dix et al. |
| 2012/0058854 A1 | 3/2012 | Shiozaki et al. |
| 2014/0128196 A1 | 5/2014 | Rintoo |
| 2015/0133251 A1 | 5/2015 | Shiozaki et al. |

FOREIGN PATENT DOCUMENTS

| | | |
|---|---|---|
| EP | 2341265 A1 | 7/2011 |
| JP | 54-45452 A | 4/1979 |
| JP | 2005-083497 A | 3/2005 |
| JP | 2005-172018 A | 6/2005 |
| JP | 2010-265939 A | 11/2010 |

\* cited by examiner

WORK VEHICLE

CROSS-REFERENCE TO RELATED APPLICATIONS

The present application is a continuation application of International Application No. PCT/JP2015/077539, filed Sep. 29, 2015, which claims priority to Japanese Patent Application No. 2014-215742, filed Oct. 22, 2014. The contents of these applications are incorporated herein by reference in their entirety.

BACKGROUND OF THE INVENTION

The present invention relates to a work vehicle.

Some conventional work vehicles, such as a tractor and a wheel loader, include a transmission case, to which driving force is transmitted from an engine, provided with a hydraulic mechanical transmission (HMT). In Japanese Unexamined Patent Application Publication No. 2005-83497 that has been filed by the applicants, an inline hydraulic mechanical transmission is proposed in which a hydraulic pump and a hydraulic motor are arranged in series in such a manner that an input shaft of the hydraulic pump and an output shaft of the hydraulic motor are concentrically positioned.

In the inline hydraulic mechanism transmission, the output shaft is fit on the input shaft, to which the driving force is transmitted from the engine, in a relatively rotatable manner. The hydraulic pump, a cylinder block, and the hydraulic motor are fit on the input shaft. The cylinder block is a single unit shared between the hydraulic pump and the hydraulic motor, and is used for transmitting the driving force from the hydraulic motor to the output shaft. Thus, the inline hydraulic mechanical transmission is advantageous over a general hydraulic mechanical transmission in that shifted driving force based on hydraulic pressure and driving force from the engine can be combined to be output, without providing a planetary gear mechanism, so that a high driving force transmission efficiency can be achieved.

The hydraulic mechanical transmission of this type needs to be designed to have a high output to be installed in a work vehicle of a middle or a large size. For example, the high output can be achieved by designing the hydraulic mechanical transmission to have a large capacity. However, a design for simply pursuing the larger capacity leads to a larger hydraulic mechanical transmission not only resulting in a higher manufacturing cost but also compromising the driving force transmission efficiency (efficiency in a low load range in particular).

SUMMARY OF THE INVENTION

A technical object of the invention according to the present application is to provide an improved work vehicle in view of the current situation described above.

A work vehicle according to the present invention includes a transmission case, installed in a traveling machine body, that includes: a main transmission input shaft to which driving force is transmitted from an engine; and a main transmission output shaft fit on the main transmission input shaft in a relatively rotatable manner. The main transmission input shaft is provided with a hydraulic pump unit, a cylinder block, and a hydraulic motor unit, forming a hydraulic mechanical transmission and being arranged in series. Shifted driving force is transmitted to the main transmission output shaft via the hydraulic motor unit. The transmission case includes: a planetary gear mechanism in which the driving force from the engine and the shifted driving force to the main transmission output shaft are combined; and a transmission shaft with which the shifted driving force via the main transmission output shaft and the combined driving force via the planetary gear mechanism are transmittable.

In the work vehicle, a swash plate inclined angle of the hydraulic pump unit may be changed from a normal inclined angle via zero to a reverse inclined angle to reduce the shifted driving force to the main transmission output shaft from a high speed to zero, and in the planetary gear mechanism, the driving force from the engine and the reduced driving force to the main transmission output shaft may be combined, and the combined driving force may cause the transmission shaft to transition from an intermediate rotation speed forward traveling state to a maximum rotation speed forward traveling state.

In the work vehicle, a swash plate inclined angle of the hydraulic pump unit may be changed from a reverse inclined angle via zero to a normal inclined angle to increase the shifted driving force to the main transmission output shaft from zero to a high speed, and the increased driving force to the main transmission output shaft may cause the transmission shaft to transition from a minimum rotation speed traveling state to an intermediate rotation speed forward traveling state.

In the work vehicle, the transmission case may include a forward traveling low speed clutch configured to connect and disconnect transmission of the driving force from the main transmission output shaft to the transmission shaft; and a forward traveling high speed clutch configured to connect and disconnect transmission of the driving force from the planetary gear mechanism to the transmission shaft.

In the work vehicle, the transmission case may include an input counter shaft through which the driving force from the engine is transmitted to the main transmission input shaft, the input counter shaft, the main transmission input shaft, the main transmission output shaft, and the transmission shaft may be arranged in parallel with each other, the input counter shaft may be provided with the planetary gear mechanism, and the transmission shaft may be provided with the forward traveling low speed clutch and the forward traveling high speed clutch.

According to the present invention, a work vehicle includes a transmission case, installed in a traveling machine body, that includes: a main transmission input shaft to which driving force is transmitted from an engine; and a main transmission output shaft fit on the main transmission input shaft in a relatively rotatable manner. The main transmission input shaft is provided with a hydraulic pump unit, a cylinder block, and a hydraulic motor unit, forming a hydraulic mechanical transmission, arranged in series. Shifted driving force is transmitted to the main transmission output shaft via the hydraulic motor unit. The transmission case includes: a planetary gear mechanism in which the driving force from the engine and the shifted driving force to the main transmission output shaft are combined; and a transmission shaft with which the shifted driving force via the main transmission output shaft and the combined driving force via the planetary gear mechanism are transmittable. Thus, a large shiftable range can be achieved by using the planetary gear mechanism without increasing the capacity of the hydraulic mechanical transmission. Thus, a higher output of the transmission case including the hydraulic mechanical transmission can be achieved with the high efficiency, light weight, and low cost of the hydraulic mechanical transmission guaranteed.

According to the present invention, a swash plate inclined angle of the hydraulic pump unit is changed from a normal inclined angle via zero to a reverse inclined angle to reduce the shifted driving force to the main transmission output shaft from a high speed to zero, and in the planetary gear mechanism, the driving force from the engine and the reduced driving force to the main transmission output shaft are combined, and the combined driving force causes the transmission shaft to transition from an intermediate rotation speed forward traveling state to a maximum rotation speed forward traveling state. Thus, a large shiftable range can be guaranteed by using the planetary gear mechanism without increasing the capacity of the hydraulic mechanical transmission. Thus, a higher output of the transmission case can be achieved while further achieving the high efficiency, light weight, and low cost of the hydraulic mechanical transmission.

According to the present invention, a swash plate inclined angle of the hydraulic pump unit is changed from a reverse inclined angle via zero to a normal inclined angle to increase the shifted driving force to the main transmission output shaft from zero to a high speed, and the increased driving force to the main transmission output shaft causes the transmission shaft to transition from a minimum rotation speed traveling state to an intermediate rotation speed forward traveling state. Thus, an output torque for causing the zero start of the work vehicle from a state where the initial speed is zero can be guaranteed. All things considered, creeping speed performance of the work vehicle can be improved with a higher output of the transmission case achieved while further achieving the high efficiency, light weight, and low cost of the hydraulic mechanical transmission.

According to the present invention, the transmission case includes an input counter shaft through which the driving force from the engine is transmitted to the main transmission input shaft, the input counter shaft, the main transmission input shaft, the main transmission output shaft, and the transmission shaft are arranged in parallel with each other, the input counter shaft is provided with the planetary gear mechanism, and the transmission shaft is provided with the forward traveling low speed clutch and the forward traveling high speed clutch. Thus, the hydraulic mechanical transmission, the planetary gear mechanism, the forward traveling low speed clutch, and the forward traveling high speed clutch can be arranged in a compact manner to facilitate an attempt to achieve the transmission case with a compact structure.

DESCRIPTION OF THE EMBODIMENTS

Figure 1:
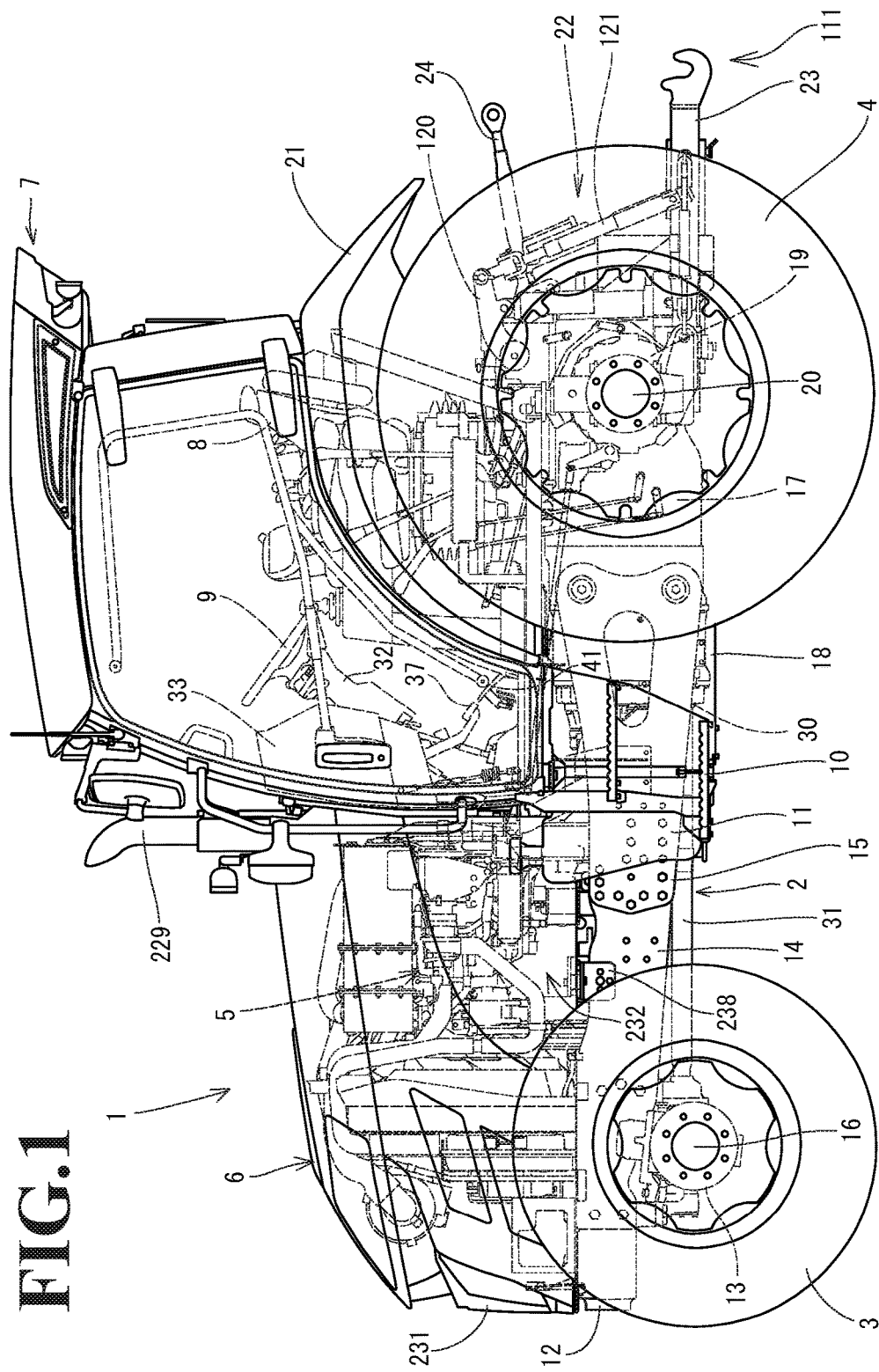
FIG. 1 is a left side view of a tractor.

A farming tractor as an embodiment of the present invention is described below with reference to the drawings. As illustrated in FIG. 1 to FIG. 8, a traveling machine body 2 of a tractor 1 is supported with a pair of left and right front wheels 3 as a traveling unit and with a pair of left and right rear wheels 4 corresponding to a rear traveling unit. A diesel engine 5 (hereinafter, simply referred to as an engine) is mounted on a front portion of the traveling machine body 2 and drives the rear wheels 4 or the front wheels 3, so that the tractor 1 can travel forward and backward. The engine 5 is covered by a hood 6. The traveling machine body 2 has an upper surface provided with a cabin 7. The cabin 7 incorporates an operating seat 8 and a steering wheel 9 for performing a steering operation for the front wheels 3. Steps 10 with which an operator gets on and off the vehicle are provided to left and right outer sides of the cabin 7. Fuel tanks 11 for supplying fuel to the engine 5 are disposed on a lower side of a bottom portion of the cabin 7.

The traveling machine body 2 includes: an engine frame 14 including a front bumper 12 and a front axle casing 13; and left and right vehicle body frames 15 detachably fixed to a rear portion of the engine frame 14. A front axle 16 rotatably protrudes outward from both left and right ends of the front axle casing 13. The front wheels 3 are attached to the both left and right ends of the front axle casing 13 via the front axle 16. A transmission case 17 is coupled to the rear portions of the vehicle body frames 15. The transmission case 17 shifts the rotary driving force from the engine 5 as appropriate, and transmits the force to the four front and rear wheels 3, 3, 4, and 4. A tank frame 18 having a rectangular plate shape in bottom view and protruding outward toward the left and right is fastened to a lower surface side of the transmission case 17 and the left and right vehicle body frames 15 with bolts. In this embodiment, the fuel tanks 11 include two left and right fuel tanks. The left and the right fuel tanks 11 are respectively mounted on the upper surface sides of the left and right protruding portions of the tank frame 18. Left and right rear axle cases 19 are mounted to left and right outer side surfaces of the transmission case 17 while protruding outward. Left and right rear axles 20 are rotatably inserted in the left and right rear axle cases 19. The rear wheels 4 are attached to the transmission case 17 via the rear axles 20. The left and the right rear wheels 4 have upper sides covered with left and right rear fenders 21.

A hydraulic lifting and lowering mechanism 22 that can lift and lower a ground work machine (not illustrated), such as a rotary tiller for example, is detachably attached to a rear portion of the transmission case 17. The ground work machine is coupled to the rear portion of the transmission case 17 via a three-point linkage mechanism 111 including a pair of left and right lower links 23 and a top link 24. A power-take off (PTO) shaft 25 protrudes rearward from a rear side surface of the transmission case 17 and is used for transmitting a PTO driving force to the work machine such as a rotary tiller.

A flywheel 26 is attached to be directly coupled to an output shaft (piston rod) of the engine 5 that protrudes rearward from a rear side surface of the engine 5 (see FIGS. 4 to 6, FIG. 10, and FIG. 11). A main driving shaft 27 protruding rearward from the flywheel 26 and an input counter shaft 28 protruding forward from a front surface side of the transmission case 17 are coupled to each other via a driving force transmission shaft 29 including universal joints on both ends (see FIGS. 4 to 6). The transmission case 17 incorporates a hydraulic mechanical transmission 500, a forward/backward traveling switching mechanism 501, a traveling transmission gear mechanism, and a rear wheel differential gear mechanism 506. The rotary driving force from the engine 5 is transmitted to the input counter shaft 28 of the transmission case 17 via the main driving shaft 27 and the driving force transmission shaft 29, and appropriate shifting is achieved with the hydraulic mechanical transmission 500 and the traveling transmission gear mechanism, and the resultant shifted driving force is transmitted to the left and right rear wheels 4 via the rear wheel differential gear mechanism 506.

A front wheel output shaft 30 protruding forward from a lower portion of a front surface of the transmission case 17 is coupled to a front wheel transmission shaft 508 protruding rearward from the front axle casing 13 incorporating a front wheel differential gear mechanism 507, via a front wheel driving shaft 31. The shifted driving force, obtained by the hydraulic mechanical transmission 500 and the traveling transmission gear mechanism in the transmission case 17, is transmitted to the left and right front wheels 3 from the front wheel output shaft 30, the front wheel driving shaft 31 and the front wheel transmission shaft 508, via the front wheel differential gear mechanism 507 in the front axle casing 13.

Next, an internal structure of the cabin 7 is described with reference to figures such as FIGS. 3, 7, and 8. A steering column 32 is disposed on a front side of the operating seat 8 in the cabin 7. The steering column 32 stands while being buried on a rear surface side of a dashboard 33 disposed on a front surface side in the cabin 7. The steering wheel 9 having a substantially circular shape in plan view is attached to an upper end side of a steering shaft protruding upward from an upper surface of the steering column 32.

A pair of left and right brake pedals 35 used for performing a braking operation for the traveling machine body 2 are disposed on the right side of the steering column 32. A forward and backward travel switching lever 36 (reverser lever) and a clutch pedal 37 are disposed on the left side of the steering column 32. The forward and backward travel switching lever 36 is used for switching the traveling direction of the traveling machine body 2 between forward and backward. The clutch pedal 37 is used for performing hydraulic oil disengagement operation for a master control solenoid valve 635 (see FIG. 24) for driving force engagement/disengagement.

A misoperation preventing member 38 (reverser guard), which is disposed below and extends along the forward and backward travel switching lever 36, is disposed on the left side of the steering column 32. The misoperation preventing member 38 as a contact prevention member is disposed below the forward and backward travel switching lever 36 so that the operator getting on and off the tractor 1 can be prevented from accidentally being in contact with the forward and backward travel switching lever 36. An operation display board 39, incorporating a liquid crystal panel, is disposed on the upper portion side of a back surface of the dashboard 33.

An acceleration pedal 41 is disposed on the right side of the steering column 32 on a floor plate 40 in front of the operating seat 8 in the cabin 7. The acceleration pedal 41 is used for controlling an engine speed of the engine 5, a vehicle speed, or the like. The floor plate 40 has an upper surface that is flat substantially over the entire area. Side columns 42 are disposed on left and right sides of the operating seat 8. A parking brake lever 43, an ultra-low speed lever 44 (creep lever), a sub transmission lever 45, and a PTO transmission lever 46 are disposed between the operating seat 8 and the left side column 42. The parking brake lever 43 is used for executing an operation of maintaining a braking state of both left and right rear wheels 4. The ultra-low speed lever 44 (creep lever) is used for forcibly and largely reducing the traveling speed (vehicle speed) of the tractor 1. The sub transmission lever 45 is used for switching an output range of a traveling sub transmission gear mechanism in the transmission case 17. The PTO transmission lever 46 is used for performing a switching operation for a driving speed of the PTO shaft 25. A diff-lock pedal 47, for activating and deactivating differential driving of both left and right rear wheels 4, is disposed on the lower side of the operating seat 8. A sub PTO lever 48 for causing vehicle speed synchronized driving or causing reverse driving of the PTO shaft 25 is disposed on the rear-left side of the operating seat 8.

An arm rest 49 where the arm or the elbow of the operator seated on the operating seat 8 rests is disposed between the operating seat 8 and the left side column 42. The arm rest 49 is provided separately from the operating seat 8, and includes a main transmission lever 50 and a work machine position dial 51 (lifting and lowering dial). The main transmission lever 50 is used for increasing and reducing the traveling speed of the tractor 1. The work machine position dial 51 is a dial with which the height position of the ground work machine, such as a rotary tiller, is manually changed and adjusted. The arm rest 49 is configured to be pivotable about its rear end lower portion to be raised by a plurality of stages.

A throttle lever 52, a PTO clutch switch 53, and a plurality of hydraulic operation levers 54 (SCV levers) are disposed in order from the front side on the left side column 42. The throttle lever 52 is used for setting and maintaining the engine speed of the engine 5. The PTO clutch switch 53 is for performing an engagement/disengagement operation for driving force transmission from the PTO shaft 25 to the work machine such as a rotary tiller. The plurality of hydraulic operation levers 54 (SCV levers) are used for performing a switching operation for hydraulic pressure output valves 430 (see FIG. 24) disposed on the upper surface side of the transmission case 17. The hydraulic pressure output valves 430 are used for controlling supplying of hydraulic oil to a hydraulic device of another work machine, such as a front loader retrofitted to the tractor 1. In the embodiment, the number of the hydraulic operation levers 54 is four so as to be the same as the number of (four) the hydraulic pressure output valves.

As illustrated in figures such as FIGS. 9 to 12, left and right front supporting platforms 96 that support the front side of the cabin 7 and left and right rear supporting platforms 97 that support a rear portion of the cabin 7 are provided. The front supporting platforms 96 are bolted onto intermediate portions of vehicle outer side surfaces of the left and right vehicle body frames 15 in a front and rear direction. The cabin 7 has front side bottom portions supported on the upper surface sides of the front supporting platforms 96 in a vibration proof manner via anti-vibration rubber piece members 98. The rear supporting platforms 97 are bolted on left and right intermediate portions of the upper surfaces of the left and right rear axle cases 19, in a width direction. The rear axle cases 19 extend horizontally in a left and right direction. The cabin 7 has rear side bottom portions supported on the upper surface sides of the rear supporting platforms 97 in a vibration proof manner via anti-vibration rubber piece members 99. As illustrated in figures such as FIGS. 4 and 5, the rear supporting platforms 97 are disposed on the upper surface side of the rear axle cases 19. An anti-vibration bracket 101 is disposed on the lower surface side of the rear axle case 19, and is fastened to the rear supporting platform 97 with bolts. A stopper rod member 103, with a turnbuckle that can be adjusted to extend and contract, has both end portions coupled to intermediate portions of the lower links 23, extending in the front and rear direction, and the anti-vibration bracket 101. Thus, swing vibrations of the lower links 23 in the left and right direction are prevented.

Next, the engine 5 below the hood 6 and an engine compartment structure are described with reference to figures such as FIGS. 4 to 8. The engine 5 has a cylinder head mounted on a cylinder block incorporating an engine output shaft and a piston. The engine 5 (cylinder head) has a right side surface provided with an intake manifold 203 and an EGR device 210. The intake manifold 203 is coupled to an air cleaner 221 via a turbo supercharger 211. The EGR device 210 partially recirculates exhaust gas from an exhaust manifold 204. When the exhaust gas discharged to the exhaust manifold 204 partially recirculates to the intake manifold 203, the maximum combustion temperature at the time of high load driving is reduced, whereby an amount of nitrogen oxides (NOx) discharged from the engine 5 is reduced. The engine 5 (cylinder head) has a left side surface provided with the exhaust manifold 204 coupled to a tail pipe 229 and the turbo supercharger 211. Thus, the engine 5 has the intake manifold 203 and the exhaust manifold 204 respectively arranged on the left and right side surfaces along the engine output shaft. A cooling fan 206 is disposed on the front surface side of the engine 5 (cylinder block).

As illustrated in figures such as FIGS. 4 to 8, the engine 5 includes a continuously regenerating exhaust gas purifying device 224 (DPF) disposed on the upper surface side (above the exhaust manifold 204) of the engine 5. The exhaust gas purifying device 224 has an exhaust side coupled to the tail pipe 229. The exhaust gas purifying device 224 removes particulate matters (PM), and reduces carbon oxide (CO) and hydrocarbon (HC) in the exhaust gas discharged from the engine 5 to the outside of the vehicle through the tail pipe 229.

Figure 2:
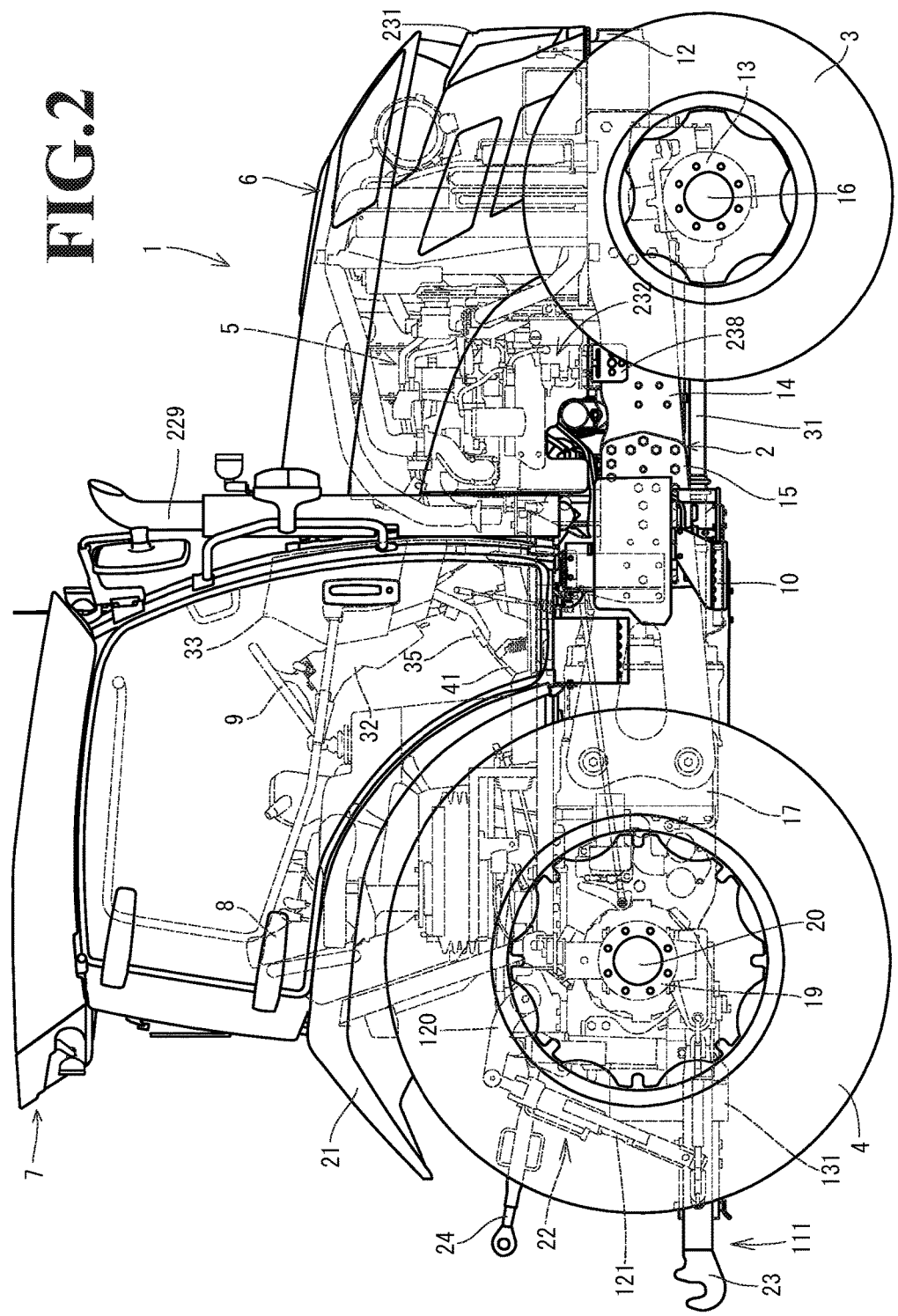
FIG. 2 is a right side view of the tractor.
Figure 3:
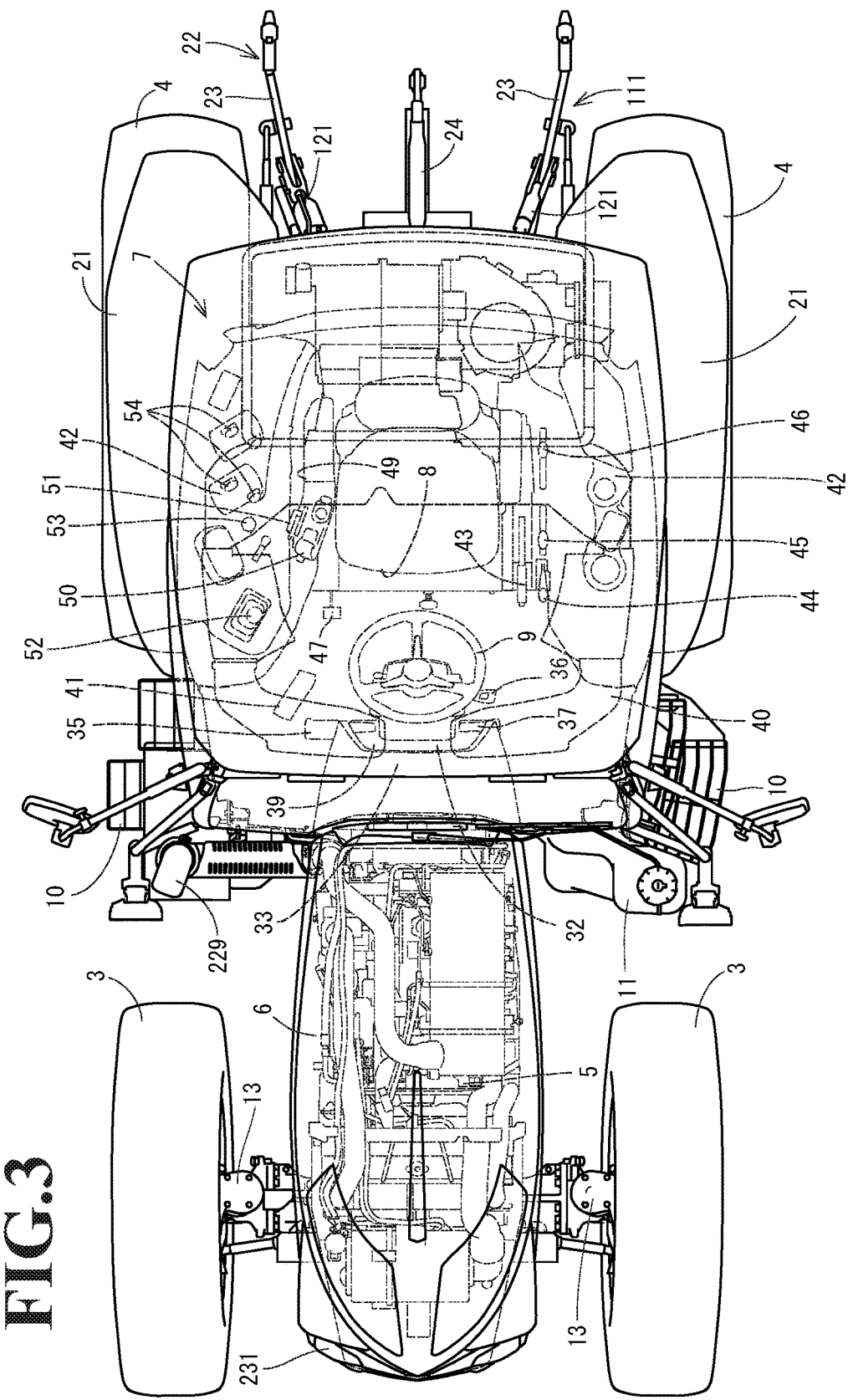
FIG. 3 is a plan view of the tractor.

As illustrated in figures such as FIGS. 1 to 3, the hood 6 has a front portion having the lower side provided with a front grille 231 and covers the upper surface side and the front surface side of an engine compartment 200. Side engine covers 232 formed of porous plates are disposed on left and right lower sides of the hood 6 to cover left and right sides of the engine compartment 200. Thus, the hood 6 and the engine covers 232 cover the front, upper, left and right sides of the engine 5.

A radiator 235 having a rear surface side on which a fan shroud 234 is attached stands on the engine frame 14 to be positioned on the front surface side of the engine 5 as illustrated in FIGS. 4 to 8. The fan shroud 234 surrounds the outer circumference side of the cooling fan 206, and establishes a communication between the radiator 235 and the cooling fan 206. The air cleaner 221 is provided on an upper position of the front surface of the radiator 235. The front surface side of the radiator 235 is provided with the intercooler described above, as well as oil and fuel coolers and the like.

As illustrated in figures such as FIGS. 9 to 12, the pair of left and right vehicle body frames 15 are coupled to each other via a supporting beam frame 236. The supporting beam frame 236 is bolted onto each of the left and right vehicle body frames 15 to bridge between front end portions (rear surface side of the engine 5) of the left and right vehicle body frames 15. The engine 5 has a rear portion coupled to the upper surface of the supporting beam frame 236 via engine legs with anti-vibration rubber pieces. As illustrated in FIGS. 1, 2, 4, 5, 11, and 12, the left and right side surfaces of the front portion of the engine 5 are coupled to intermediate portions of the pair of left and right engine frames 14, via left and right front engine legs 238 having anti-vibration rubber pieces. Thus, the engine 5 has the front side supported in a vibration proof manner by the engine frame 14, and has a rear portion supported in a vibration proof manner by the front end side of the pair of left and right vehicle body frames 15 via the supporting beam frame 236.

Next, an attachment structure for the transmission case 17, the hydraulic lifting and lowering mechanism 22, and the three-point linkage mechanism 111 will be described with reference to FIGS. 4 to 12. The transmission case 17 includes: a front transmission case 112 including the input counter shaft 28 and the like; a rear transmission case 113 including the rear axle case 19 and the like; and an intermediate case 114 that couples the front side of the rear transmission case 113 to the rear side of the front transmission case 112. The left and right vehicle body frames 15 have rear end portions coupled to the left and right side surfaces of the intermediate case 114 via left and right upper and lower vehicle body coupling shaft members 115 and 116. The left and right vehicle body frames 15 have rear end portions coupled to the left and right side surfaces of the intermediate case 114 via the two upper vehicle body coupling shaft members 115 and the two lower vehicle body coupling shaft members 116. Thus, the vehicle body frames 15 and the transmission case 17 are integrated for forming the rear portion of the traveling machine body 2. The front transmission case 112, the driving force transmission shaft 29, or the like is provided between the left and right vehicle body frames 15, whereby the front transmission case 112 or the like is protected. The left and the right rear axle cases 19 are attached on both the left and right sides of the rear transmission case 113 in such a manner as to protrude outward. In the embodiment, the intermediate case 114 and the rear transmission case 113 are made of cast iron and the front transmission case 112 is made of die-cast aluminum.

In the configuration described above, the transmission case 17 is divided into three sections of the front transmission case 112, the intermediate case 114, and the rear case 113. Thus, the transmission case 17 can be assembled accurately and efficiently with the front transmission case 112, the intermediate case 114, and the rear transmission case 113 provided with parts such as a shaft and a gear in advance, and then assembled.

The left and the right rear axle cases 19 are attached to left and right sides of the rear transmission case 113. The intermediate case 114 coupling the front transmission case 112 and the rear transmission case 113 to each other is coupled to the left and right vehicle body frames 15 forming the traveling machine body 2. Thus, for example, only the front transmission case 112 can be detached, for performing operations such as replacement of the shaft and the gear, with the intermediate case 114 and the rear transmission case 113 remaining attached to the vehicle body frames 15. Thus, the transmission case 17 as a whole is much less frequently removed (detached) from the tractor 1, whereby the maintenance and repairing can be performed with much higher operability.

The intermediate case 114 and the rear transmission case 113 are made of case iron, and the front transmission case 112 is made of die-cast aluminum. Thus, the intermediate case 114 coupled to the vehicle body frames 15 and the rear transmission case 113 to which the left and right rear axle cases 19 are coupled can be formed as strength members forming the traveling machine body 2. On that condition, the front transmission case 112 that is not a strength member can have a light weight. All things considered, the transmission case 17 as a whole can be made to have a light weight, with sufficient rigidity of the traveling machine body 2 guaranteed.

As illustrated in FIGS. 4 to 12, the hydraulic lifting and lowering mechanism 22 includes left and right hydraulic lift cylinders 117, left and right lift arms 120, and left and right lift rods 121. The hydraulic lift cylinders 117 are operated and controlled in accordance with an operation on the work machine position dial 51 or the like. The lift arms 120 have base end sides pivotally supported by an openable upper surface lid member 118, provided on the side of the upper surface of the rear transmission case 113 in the transmission case 17, via a lift supporting shaft 119. The left and right lift rods 121 couple the left and right lift arms 120 to the left and right lower links 23. The right lift rod 121 is partially formed of a horizontal cylinder 122 for hydraulic control, and thus the length of the right lift rod 121 can be adjusted to be increased or reduced with the horizontal cylinder 122.

Figure 7:
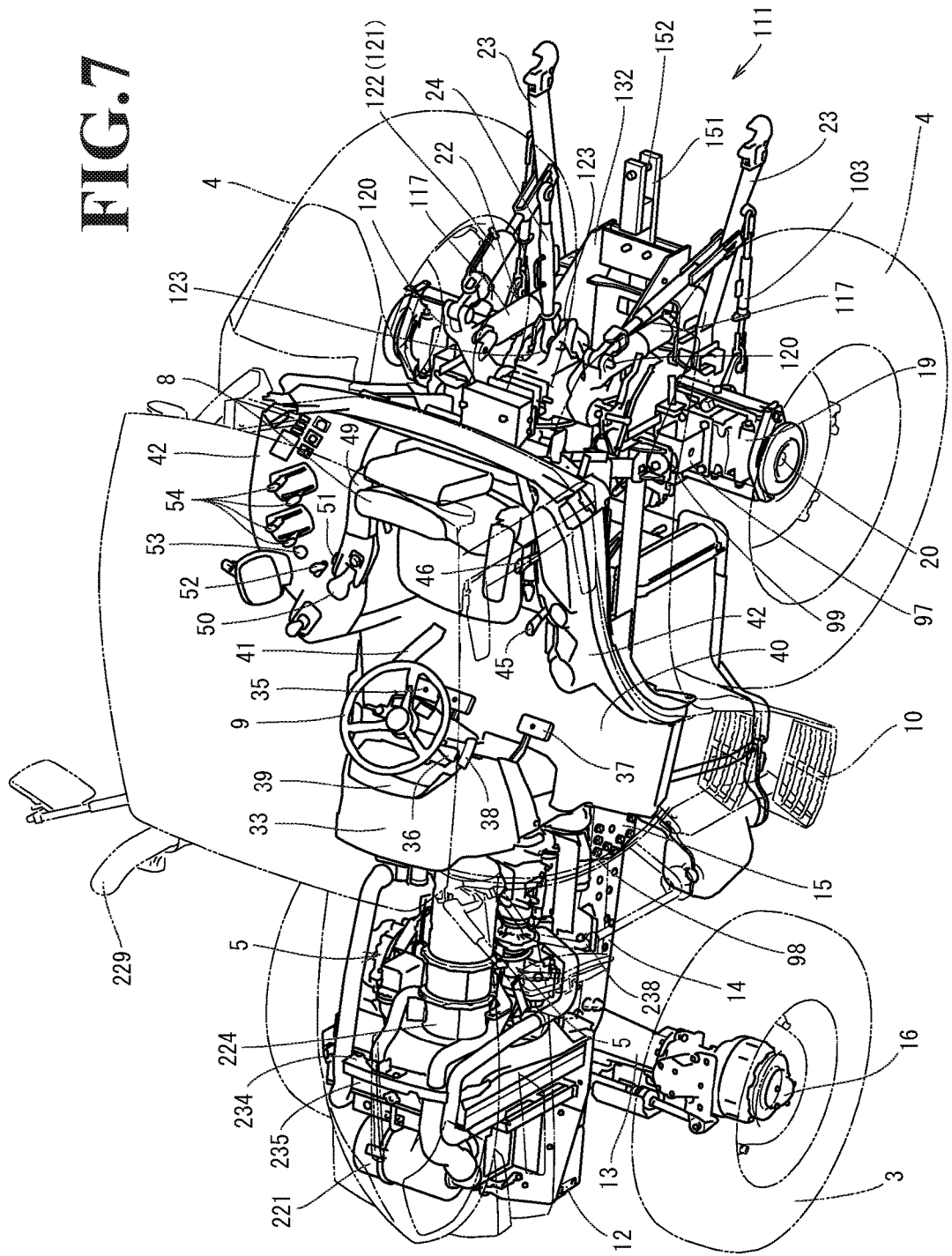
FIG. 7 is a perspective view of the traveling machine body as diagonally viewed from a rear left side.
Figure 8:
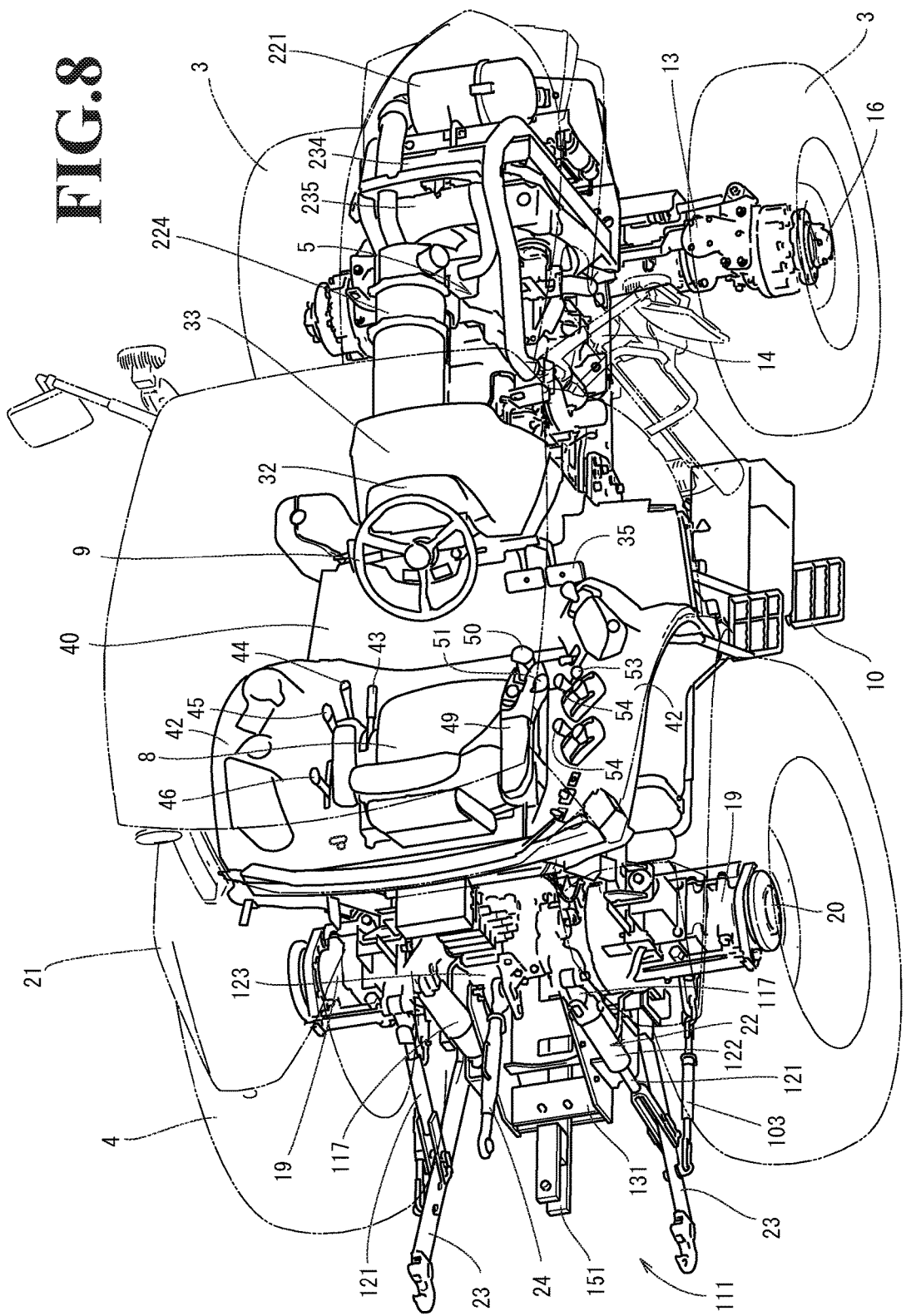
FIG. 8 is a perspective view of the traveling machine body as diagonally viewed from a rear right side.
Figure 9:
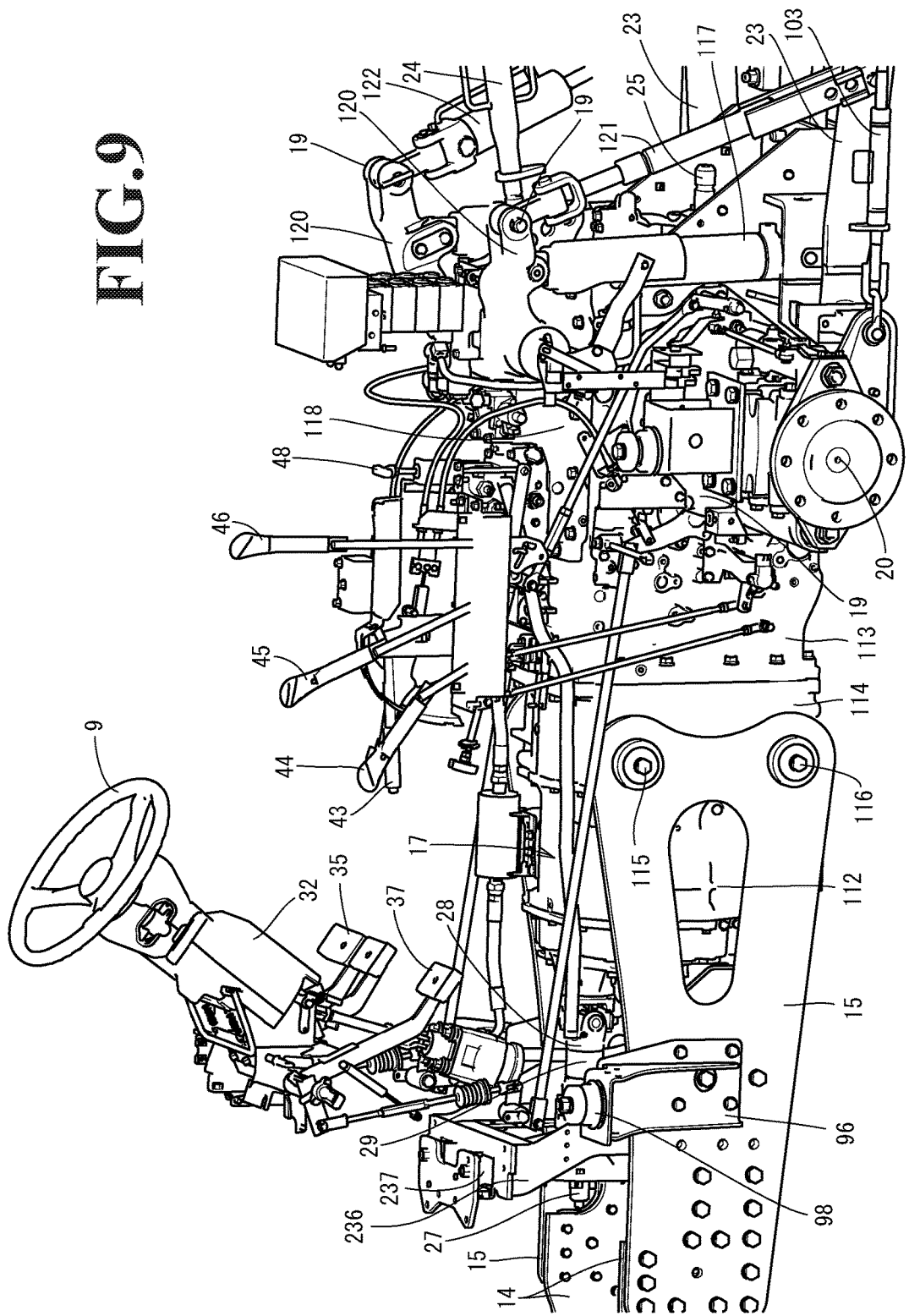
FIG. 9 is an enlarged perspective view of the traveling machine body as viewed from the left side.
Figure 10:
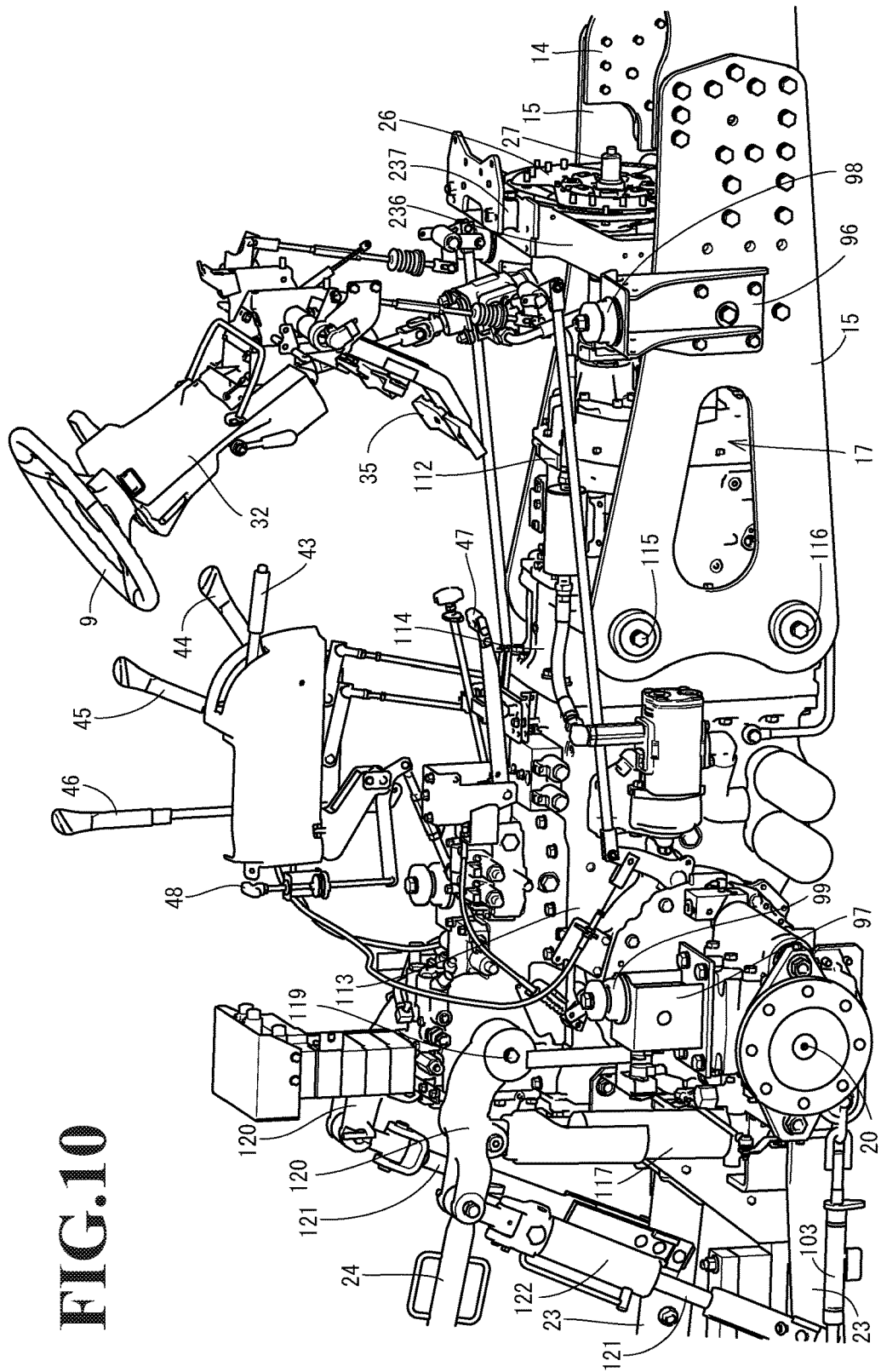
FIG. 10 is an enlarged perspective view of the traveling machine body as viewed from the right side.
Figure 11:
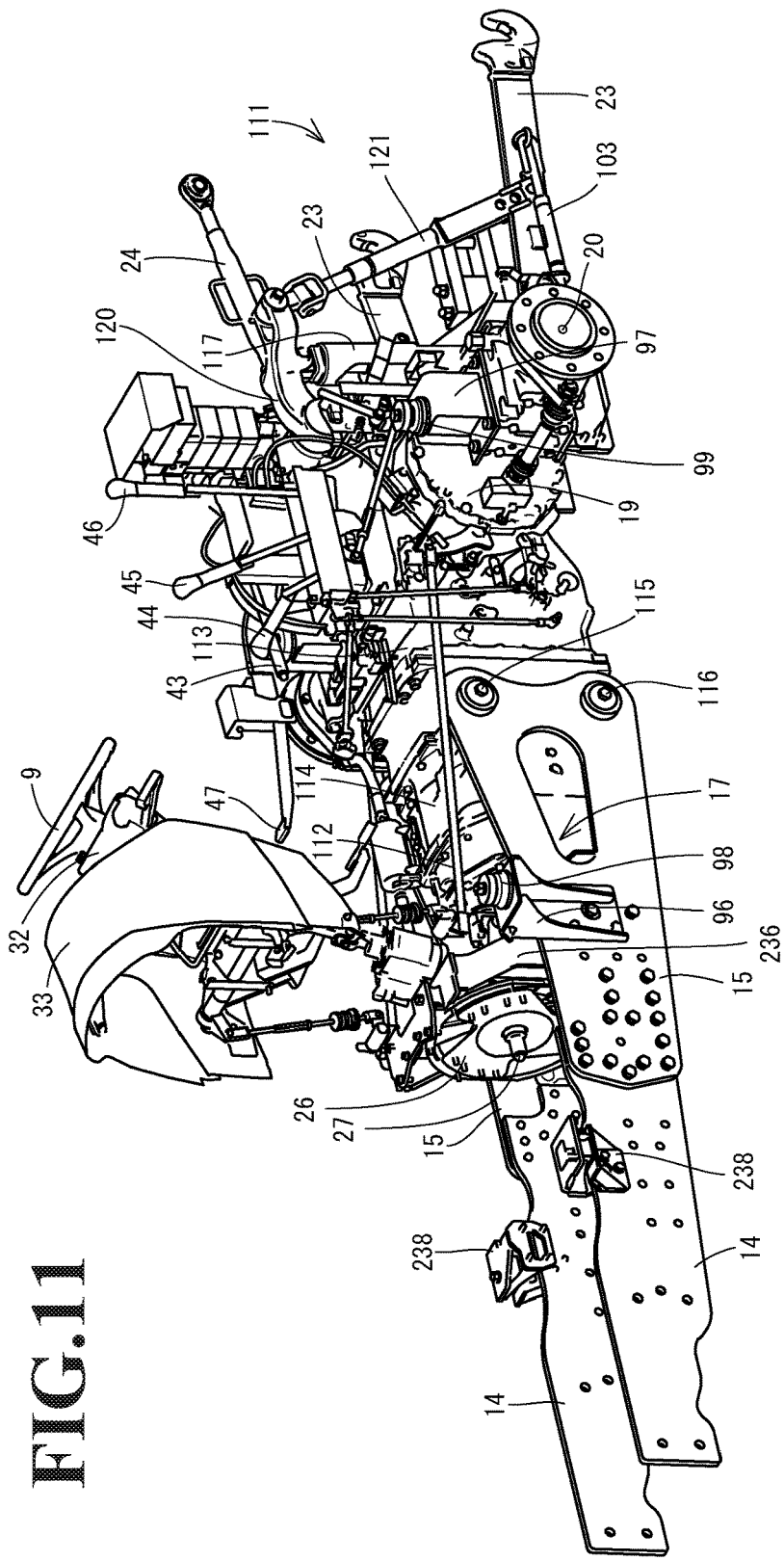
FIG. 11 is a perspective view of the traveling machine body as viewed from a left front side.
Figure 12:
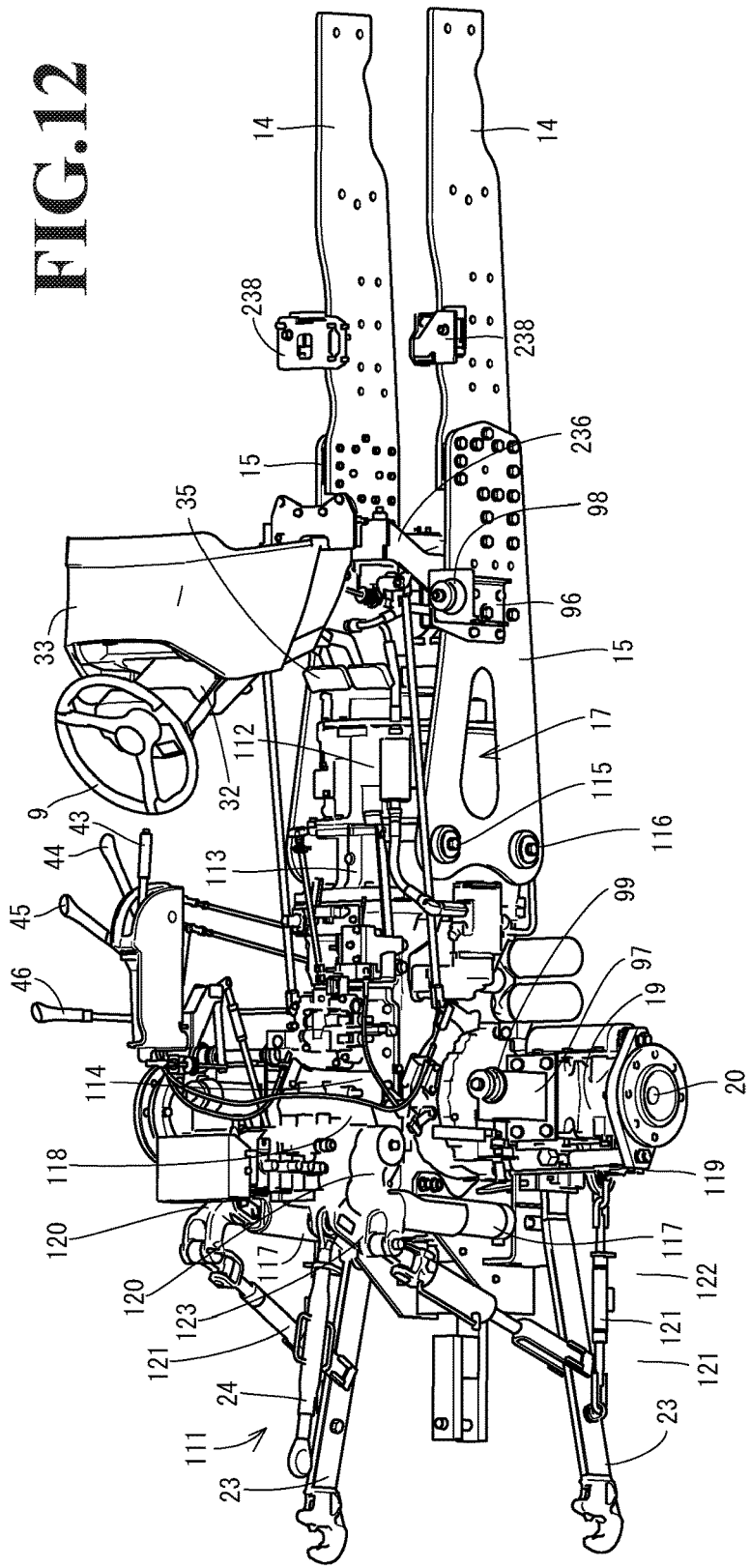
FIG. 12 is a perspective view of the traveling machine body as viewed from the right side.

As illustrated in figures such as FIGS. 7, 8, and 10, a top link hinge 123 is fixed to the rear surface side of the upper surface lid member 118, and the top link 24 is coupled to the top link hinge 123 via a hinge pin. When the piston of the horizontal cylinder 122 is extended and contracted for changing the length of the right lift rod 121 with the ground work machine being supported by the top link 24 and the left and right lower links 23, the left and right inclined angle of the ground work machine changes.

Next, an internal structure of the transmission case 17 and a driving force transmission system of the tractor 1 are described mainly with reference to FIGS. 13 to 23. The transmission case 17 includes: the front transmission case 112 including the input counter shaft 28 and the like; the rear transmission case 113 including the rear axle case 19 and the like; and the intermediate case 114 coupling the front side of the rear transmission case 113 to the rear side of the front transmission case 112. The transmission case 17 has a hollow box shape as a whole.

A front lid member 491 is disposed on a front surface of the transmission case 17, that is, a front surface of the front transmission case 112. The front lid member 491 is detachably fastened to the front surface of the front transmission case 112 with a plurality of bolts. A rear lid member 492 is disposed on a rear surface of the transmission case 17, that is, a rear surface of the rear transmission case 113. The rear lid member 492 is detachably fastened to the rear surface of the rear transmission case 113 with a plurality of bolts. An intermediate partitioning wall 493, partitioning between the front transmission case 112 and the intermediate case 114, is integrally formed on the front surface side in the intermediate case 114. A rear partitioning wall 494 that partitions between front and rear portions in the rear transmission case 113 is integrally formed on an intermediate portion of the rear transmission case 113 in the front and rear direction.

Thus, the inside of the transmission case 17 is divided, by the intermediate and the rear partitioning walls 493 and 494, into three chambers including a front chamber 495, a rear chamber 496, and an intermediate chamber 497. The front chamber 495 is a space in the transmission case 17 between the front lid member 491 and the intermediate partitioning wall 493 (in the front transmission case 112). The rear chamber 496 is provided between the rear lid member 492 and the rear partitioning wall 494 (a rear portion inside the rear transmission case 113). The intermediate chamber 497 is a space between the intermediate partitioning wall 493 and the rear partitioning wall 494 (inside the intermediate case 114 and a front portion of the rear transmission case 113). The partitioning walls 493 and 494 are partially notched so that the front chamber 495, the intermediate chamber 497, and the rear chamber 496 communicate with each other. Thus, hydraulic oil (lubricant oil) can move among the chambers 495 to 497.

The hydraulic mechanical transmission 500, a mechanical creep transmission gear mechanism 502, a traveling sub transmission gear mechanism 503, and a two-wheel drive/four-wheel drive switching mechanism 504 are disposed in the front chamber 495 of the transmission case 17 (in the front transmission case 112). The mechanical creep transmission gear mechanism 502 shifts the rotational driving force transmitted thereto via the forward/backward traveling switching mechanism 501 described later. The two-wheel drive/four-wheel drive switching mechanism 504 switches between two-wheel drive and four-wheel drive of the front and the rear wheels 3 and 4. The forward/backward traveling switching mechanism 501 is disposed in the intermediate chamber 497 of the transmission case 17 (inside the intermediate case 114 and the front portion of the rear transmission case 113). A PTO transmission mechanism 505 and the rear wheel differential gear mechanism 506 are disposed in the rear chamber 496 of the transmission case 17 (inside the rear portion of the rear transmission case 113). The forward/backward traveling switching mechanism 501 switches the rotational driving force from the hydraulic mechanical transmission 500 between a normal rotation direction and a reverse rotation direction. The PTO transmission mechanism 505 appropriately shifts the rotational driving force from the engine 5, and transmits the rotational driving force to the PTO shaft 25. The rear wheel differential gear mechanism 506 transmits the rotational driving force from the creep transmission gear mechanism 502 or the traveling sub transmission gear mechanism 503 to the left and right rear wheels 4. The creep transmission gear mechanism 502 and the traveling sub transmission gear mechanism 503 correspond to the traveling transmission gear mechanism achieving multistage shifting of the shifted output from the forward/backward traveling switching mechanism 501. A pump case 480 accommodating a work machine hydraulic pump 481 and a traveling hydraulic pump 482 driven by the rotational driving force from the engine 5, is attached to the front portion of the right outer surface of the rear transmission case 113.

Figure 4:
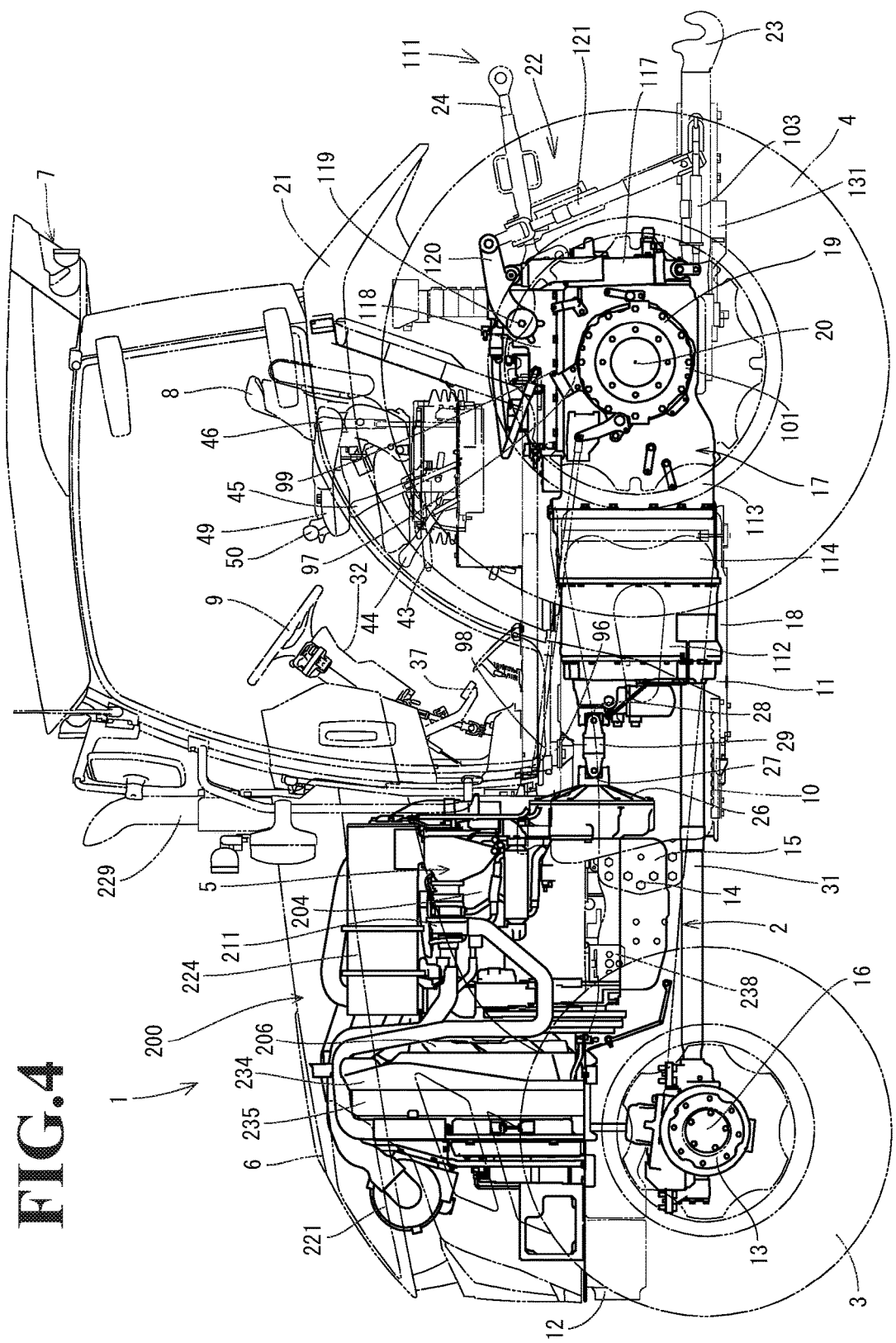
FIG. 4 is a left side view illustrating a traveling machine body.
Figure 5:
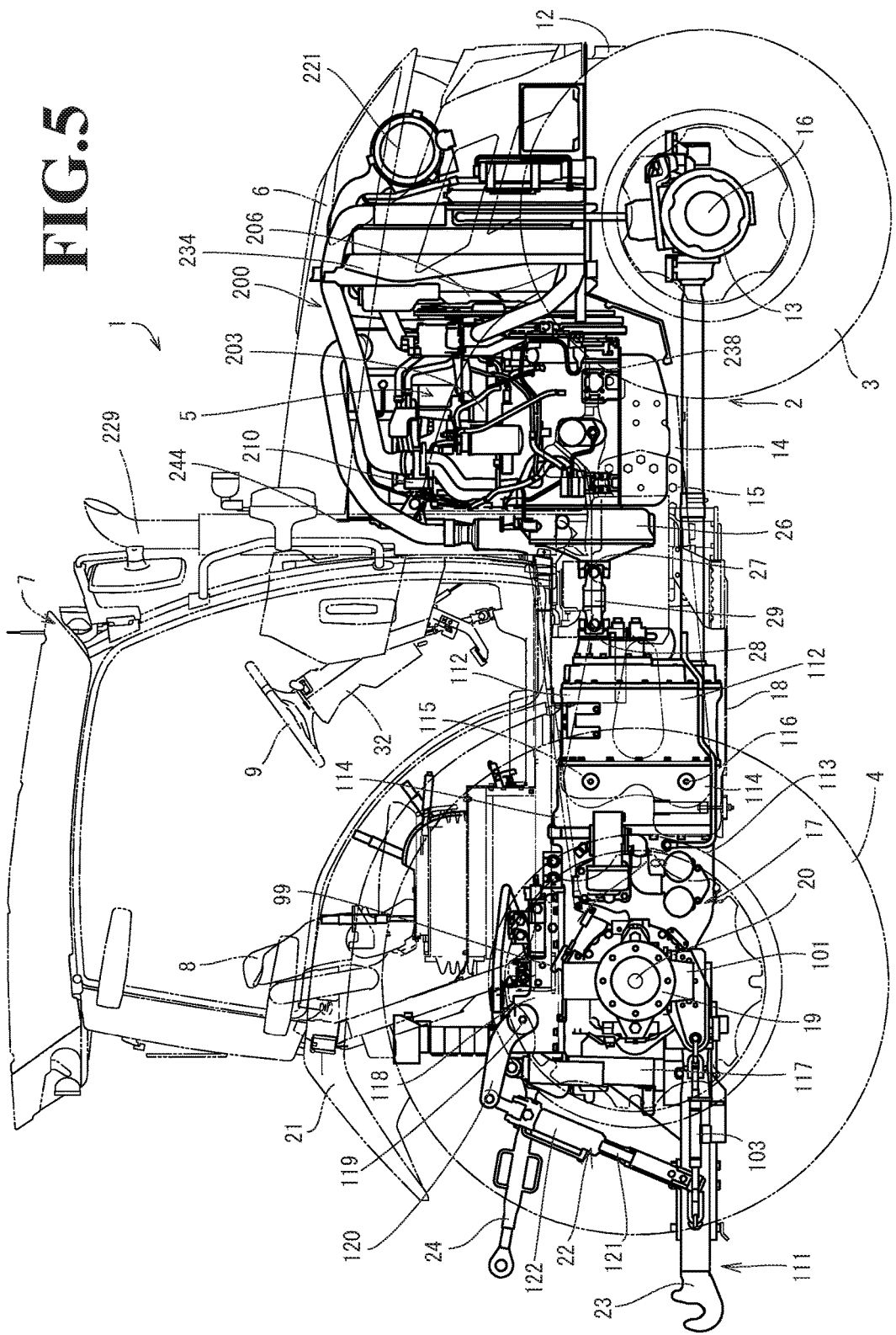
FIG. 5 is a right side view illustrating the traveling machine body.
Figure 6:
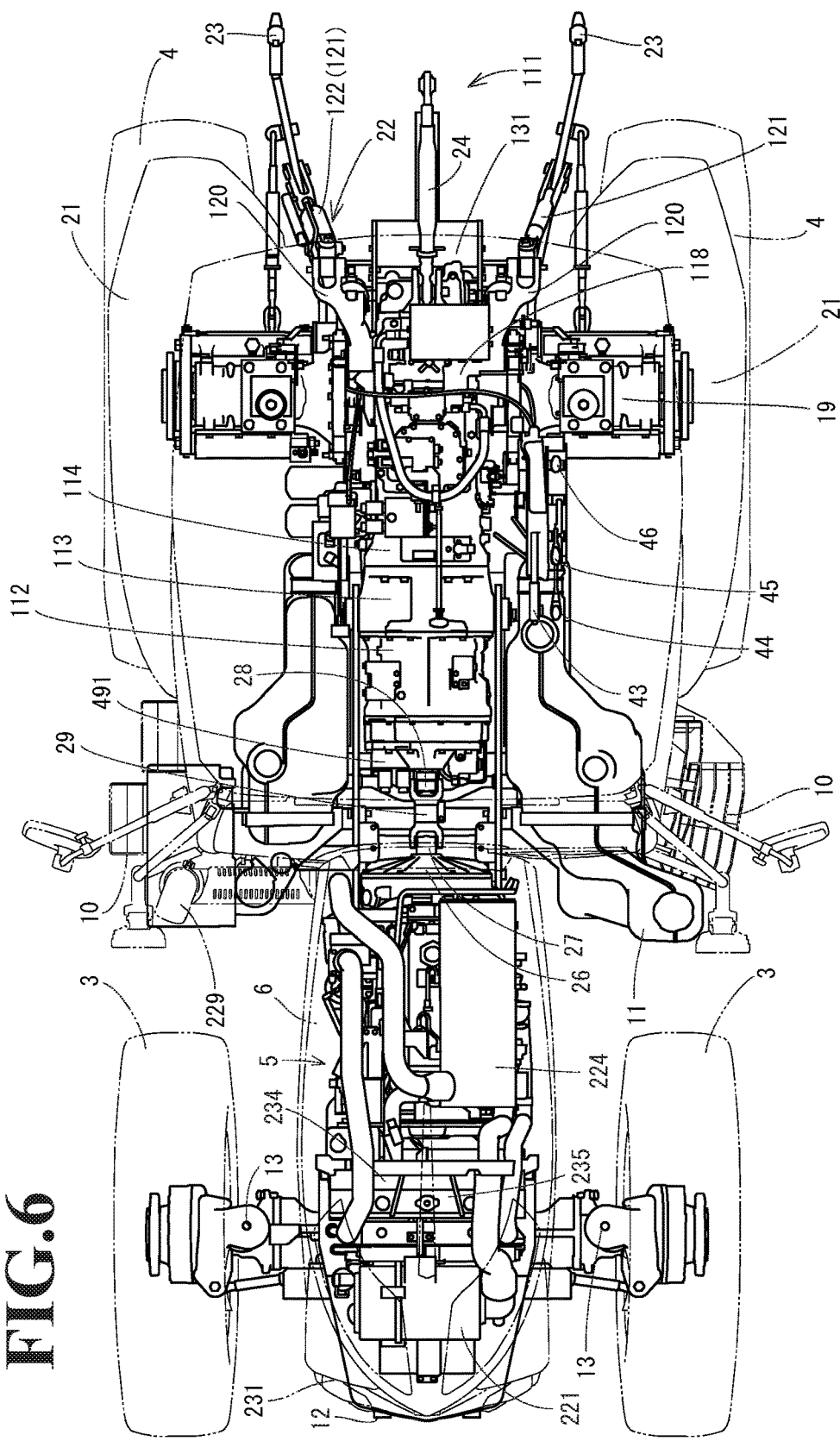
FIG. 6 is a plan view of the traveling machine body.

As illustrated in FIGS. 4 to 6, the flywheel 26 is directly coupled to the output shaft of the engine 5 protruding rearward from the rear side surface of the engine 5. The input counter shaft 28 is coupled to the main driving shaft 27 protruding rearward from the flywheel 26, via the driving force transmission shaft 29 having universal joints on both ends. The input counter shaft 28 protrudes forward from the front surface (front lid member 491) side of the transmission case 17. The rotational driving force from the engine 5 is transmitted to the input counter shaft 28 of the transmission case 17 (front transmission case 112) via the main driving shaft 27 and the driving force transmission shaft 29. Then the driving force is appropriately shifted by the hydraulic mechanical transmission 500 and the creep transmission gear mechanism 502 or the traveling sub transmission gear mechanism 503, and then is transmitted to the rear wheel differential gear mechanism 506. Thus, the left and right rear wheels 4 are driven. The shifted driving force from the creep transmission gear mechanism 502 or the traveling sub transmission gear mechanism 503 is transmitted to the front wheel differential gear mechanism 507 in the front axle casing 13, from the two-wheel drive/four-wheel drive switching mechanism 504 via the front wheel output shaft 30, the front wheel driving shaft 31, and the front wheel transmission shaft 508. Thus, the left and right front wheels 3 are driven.

The input counter shaft 28, protruding forward from the front lid member 491, extends in the front and rear direction, from the front transmission case 112 to the intermediate case 114 (from the front chamber 495 to the intermediate chamber 497). The intermediate partitioning wall 493 rotatably supports the intermediate portion of the input counter shaft 28 in the front and rear direction. The input counter shaft 28 has a rear end side rotatably supported by an intermediate supporting plate 498 detachably fastened on the front surface side (side of the intermediate chamber 497) of the rear partitioning wall 494. The intermediate supporting plate 498 and the rear partitioning wall 494 are disposed in such a manner that a gap in the front and rear direction is provided between the members 498 and 494. A main transmission input shaft 511, arranged in parallel with the input counter shaft 28, extends from the front transmission case 112 to the intermediate case 114 (from the front chamber 495 to the intermediate chamber 497) and receives the driving force from the input counter shaft 28. The hydraulic mechanical transmission 500 is disposed in the front transmission case 112 (in the front chamber 495) via the main transmission input shaft 511. The front side of the hydraulic mechanical transmission 500 is attached to the inner surface side of the front lid member 491 that is detachably attached to close the opening on the front surface of the front transmission case 112. The main transmission input shaft 511 has a rear end side rotatably supported by the intermediate supporting plate 498 and the rear partitioning wall 494.

The hydraulic mechanical transmission 500 in the front chamber 495 is an inline transmission in which a main transmission output shaft 512 is concentrically arranged with respect to the main transmission input shaft 511, and the hydraulic pump unit 521, a cylinder block 800, and a fixed capacity hydraulic motor unit 522 are arranged in series. The main transmission output shaft 512 having a cylindrical shape is fit on a portion of the main transmission input shaft 511 inside the intermediate chamber 497. The main transmission output shaft 512 has a front end side disposed through the intermediate partitioning wall 493 to be rotatably supported by the intermediate partitioning wall 493. The main transmission output shaft 512 has a rear end side rotatably supported by the intermediate supporting plate 498. Thus, the rear end side, as the input side, of the main transmission input shaft 511 protrudes rearward beyond the rear end of the main transmission output shaft 512. A main transmission input gear 513 is fit on the rear end side of the input counter shaft 28 (between the intermediate supporting plate 498 and the rear partitioning wall 494) in a relatively non-rotatable manner. An input transmission gear 514, constantly in mesh with the main transmission input gear 513, is fixed to the rear end side of the main transmission input shaft 511 (between the intermediate supporting plate 498 and the rear partitioning wall 494). Thus, the rotational driving force from the input counter shaft 28 is transmitted to the hydraulic mechanical transmission 500 via the main transmission input gear 513, the input transmission gear 514, and the main transmission input shaft 511. A main transmission high speed gear 516, a main transmission reverse gear 517, and a main transmission low speed gear 515, for traveling output, are fit on the main transmission output shaft 512 in a relatively non-rotatable manner. An input side of the main transmission input shaft 511 and an output side of the main transmission output shaft 512 are positioned on the same side (each positioned on the rear side as viewed from the hydraulic mechanical transmission 500).

The hydraulic mechanical transmission 500 includes: a variable capacity hydraulic pump unit 521; and the fixed capacity hydraulic motor unit 522 operated by high pressure hydraulic oil discharged from the hydraulic pump unit 521. The hydraulic pump unit 521 includes a pump swash plate 523 of which an inclined angle relative to the axis of the main transmission input shaft 511 can be changed for adjusting the supplied amount of the hydraulic oil. A main transmission hydraulic cylinder 524 for changing and adjusting the inclined angle of the pump swash plate 523 relative to the axis of the main transmission input shaft 511 is coupled to and interlocked with the pump swash plate 523. In the embodiment, the main transmission hydraulic cylinder 524 is assembled to the hydraulic mechanical transmission 500 to be a unit as a single member.

The hydraulic pump unit 521 and the fixed capacity hydraulic motor unit 522 are disposed, on one side and the other side of the cylinder block 800, on the main transmission input shaft 511. The cylinder block 800 is spline fit to the main transmission input shaft 511 in a relatively non-rotatable manner. The cylinder block 800 has a plurality of input side plungers 801 disposed on the side of the hydraulic pump unit 521 and a plurality of output side plungers 802 disposed on the side of the fixed capacity hydraulic motor unit 522. The plurality of input side plungers 801 are brought in contact with the pump swash plate 523 and the plurality of output side plungers 802 are brought in contact with a motor fix swash plate 803. By driving the main transmission hydraulic cylinder 524 to change the inclined angle of the pump swash plate 523, stroke of the group of input side plungers 801 (corresponding to the amount of the hydraulic oil) is changes, and stroke of the group of output side plungers 802 is changed (with the amount of the hydraulic oil supplied to the hydraulic motor unit 522 from the hydraulic pump unit 521 changed and adjusted). As a result, a main transmission operation of the hydraulic mechanism transmission 500 is performed with a rotation speed of the motor fix swash plate 803 adjusted, and thus rotation speed of the fixed capacity hydraulic motor unit 522 adjusted.

Specifically, when the main transmission hydraulic cylinder 524 is driven in proportion to the amount of operation on the main transmission lever 50, the inclined angle of the pump swash plate 523 relative to the axis of the main transmission input shaft 511 is changed accordingly. The angle of the pump swash plate 523 according to the embodiment can be adjusted within a range between the maximum inclined angles on one side (positive side) and the other side (negative side) of a neutral angle corresponding to the substantially zero inclined angle (±several angles from the zero angle), based on an inclined angle on one side when the vehicle speed of the traveling machine body 2 is the lowest (the inclined angle close to the maximum negative angle in this case).

When the inclined angle of the pump swash plate 523 is substantially zero (neutral angle), the hydraulic pump unit 521 does not cause pressing or pulling of the group of input side plungers 801. The cylinder block 800 rotates in the same direction and at a substantially the same speed as the main transmission input shaft 511. However, because no hydraulic oil is supplied from the hydraulic pump unit 521, the group of output side plungers 802 of the cylinder block 800 does not operate and thus the fixed capacity hydraulic motor unit 522 does not operate. Thus, the main transmission output shaft 512 rotates at a substantially the same speed as the main transmission input shaft 511.

When the pump swash plate 523 is inclined in one direction (by a positive inclined angle or a normal inclined angle) with respect to the axis of the main transmission input shaft 511, the hydraulic pump unit 521 supplies the hydraulic oil to the fixed capacity hydraulic motor unit 522 with the group of input side plungers 801 pushed and pulled, and the fixed capacity hydraulic motor unit 522 is rotated in the same direction as the main transmission input shaft 511 via the group of output side plungers 802 of the cylinder block 800. In this process, the cylinder block 800 rotates in the same direction and at a substantially the same speed as the main transmission input shaft 511, and thus the main transmission output shaft 512 rotates at a higher speed than the main transmission input shaft 511. Thus, the sum of the rotation speed of the main transmission input shaft 511 (that may be referred to as the rotation speed of the cylinder block 800) and the rotation speed of the hydraulic motor unit 522 is transmitted to the main transmission output shaft 512. As a result, the shifted driving force from the main transmission output shaft 512 changes in proportion to the inclined angle (by the positive inclined angle or the normal inclined angle) of the pump swash plate 523 in a rotation speed range higher than the rotation speed of the main transmission input shaft 511. When the inclined angle of the pump swash plate 523 is close to the maximum positive inclined angle, the main transmission output shaft 512 rotates at a high speed, but the traveling machine body 2 travels at an intermediate speed (see an outline square mark in FIG. 23) right in the middle between the minimum speed (substantially zero) and the maximum speed.

When the pump swash plate 523 is inclined in the other direction (by a negative inclined angle or a reverse inclined angle) with respect to the axis of the main transmission input shaft 511, the hydraulic pump unit 521 supplies the hydraulic oil to the fixed capacity hydraulic motor unit 522 with the group of input side plungers 801 pushed and pulled, and the fixed capacity hydraulic motor unit 522 is rotated in the direction opposite to that of the main transmission input shaft 511 via the group of output side plungers 802 of the cylinder block 800. In this process, the cylinder block 800 rotates in the same direction and at a substantially the same speed as the main transmission input shaft 511, and thus the main transmission output shaft 512 rotates at a lower speed than the main transmission input shaft 511. Thus, a result of subtracting the rotation speed of the hydraulic motor unit 522 from the rotation speed of the main transmission input shaft 511 (that may be referred to as the cylinder block 800) is transmitted to the main transmission output shaft 512. As a result, the shifted driving force from the main transmission output shaft 512 changes in proportion to the inclined angle (by the negative inclined angle or the reverse inclined angle) of the pump swash plate 523 in a rotation speed range lower than the rotation speed of the main transmission input shaft 511. When the inclined angle of the pump swash plate 523 is close to the maximum positive inclined angle, the main transmission output shaft 512 rotates at the minimum speed (substantially zero) (see an outline circle mark in FIG. 23). In this embodiment, the traveling machine body 2 is configured to travel at the minimum speed (substantially zero) or at the maximum speed when the inclined angle of the pump swash plate 523 is close to the negative maximum inclined angle.

A pump drive gear 484 is fit on a pump drive shaft 483, for driving the work machine and the traveling hydraulic pumps 481 and 482, in a relatively non-rotatable manner. The pump drive gear 484 is coupled to the main transmission input gear 513 of the input counter shaft 28 via a spur gear mechanism 485, in a driving force transmittable manner. A lubricant oil pump 518 for supplying the hydraulic oil for lubrication to the hydraulic mechanical transmission 500, the forward/backward traveling switching mechanism 501, and the like, is provided between the intermediate supporting plate 498 and the rear partitioning wall 494. The pump gear 520 fixed to a pump shaft 519 of the lubricant oil pump 518 is constantly in mesh with the input transmission gear 514 of the main transmission input shaft 511. The work machine and traveling hydraulic pumps 481 and 482 for the work machine and the lubricant oil pump 518 are driven by the rotational driving force from the engine 5.

Next, a structure for switching between the forward traveling and the backward traveling via the forward/backward traveling switching mechanism 501 is described. A planetary gear mechanism 526 as a forward traveling high speed gear mechanism and a pair of low speed gears 525 as a forward traveling low speed gear mechanism are disposed on portions of the input counter shaft 28 in the intermediate chamber 497 (on the rear side of the input counter shaft 28). The planetary gear mechanism 526 includes: a sun gear 531 that integrally rotates with an input side transmission gear 529 rotatably supported on the input counter shaft 28; a carrier 532 rotatably supporting a plurality of planetary gears 533 on the same radius; and a ring gear 534 with an inner circumference surface provided with internal teeth. The sun gear 531 and the ring gear 534 are rotatably fit on the input counter shaft 28. The carrier 532 is fit on the input counter shaft 28 in a relatively non-rotatable manner. The sun gear 531 meshes with the planetary gears 533 of the carrier 532 from a radially inner side. The internal teeth of the ring gear 534 mesh with the planetary gears 533 from a radially outer side. The input counter shaft 28 further rotatably supports an output side transmission gear 530 that integrally rotates with the ring gear 534. An input side low speed gear 527 and an output side low speed gear 528, forming the pair of low speed gears 525, form an integrated structure, and are rotatably supported on a portion of the input counter shaft 28 between the planetary gear mechanism 526 and the main transmission input gear 513.

A traveling relay shaft 535 and a traveling transmission shaft 536, extending in parallel with the input counter shaft 28, the main transmission input shaft 511, and the main transmission output shaft 512, are disposed in the intermediate chamber 497 of the transmission case 17 (inside the intermediate case 114 and the front portion of the rear transmission case 113). The traveling relay shaft 535 has a front end side rotatably supported by the intermediate partitioning wall 493. The traveling relay shaft 535 has a rear end side rotatably supported by the intermediate supporting plate 498. The traveling transmission shaft 536 has a front end side rotatably supported by the intermediate partitioning wall 493. The traveling transmission shaft 536 has a rear end side rotatably supported by the intermediate supporting plate 498.

The traveling relay shaft 535 serving as a transmission shaft is provided with the forward/backward traveling switching mechanism 501. More specifically, a front traveling high speed gear 540, a backward traveling gear 542, and a forward traveling low speed gear 538 are fit on the traveling relay shaft 535. The front traveling high speed gear 540 is coupled with a forward traveling high speed clutch (a multiple wet forward traveling high speed hydraulic clutch) 539. The backward traveling gear 542 is coupled with a multiple wet backward traveling hydraulic clutch 541. The forward traveling low speed gear 538 is coupled with a forward traveling low speed clutch (a multiple wet forward traveling low speed hydraulic clutch) 537. A traveling relay gear 543 is fit on a portion of the traveling relay shaft 535 between the forward traveling high speed clutch 539 and the backward traveling gear 542 in a relatively non-rotatable manner. A traveling transmission gear 544, constantly in mesh with the traveling relay gear 543, is fit on the traveling transmission shaft 536 in a relatively non-rotatable manner. The input side low speed gear 527 of the pair of low speed gears 525 on the side of the input counter shaft 28 is constantly in mesh with the main transmission low speed gear 515 of the main transmission output shaft 512. The output side low speed gear 528 is constantly in mesh with the forward traveling low speed gear 538. The input side transmission gear 529 of the planetary gear mechanism 526 on the side of the input counter shaft 28 is constantly in mesh with the main transmission high speed gear 516 of the main transmission output shaft 512. The output side transmission gear 530 is constantly in mesh with the front traveling high speed gear 540. The main transmission reverse gear 517 of the main transmission output shaft 512 is constantly in mesh with the backward traveling gear 542.

When a forward traveling side operation is performed on the forward and backward travel switching lever 36, the forward traveling low speed clutch 537 or the forward traveling high speed clutch 539 transitions to a driving force connected state, and the forward traveling low speed gear 538 or the front traveling high speed gear 540 and the traveling relay shaft 535 are coupled to each other in a relatively non-rotatable manner. As a result, the forward traveling low speed or forward traveling high speed rotational driving force is transmitted from the main transmission output shaft 512 to the traveling relay shaft 535 via the pair of low speed gears 525 or the planetary gear mechanism 526. Thus, the driving force is transmitted from the traveling relay shaft 535 to the traveling transmission shaft 536. When a backward traveling side operation is performed on the forward and backward travel switching lever 36, the backward traveling hydraulic clutch 541 transitions to the driving force connected state, and the backward traveling gear 542 and the traveling relay shaft 535 are coupled to each other in a relatively non-rotatable manner. As a result, backward traveling rotational driving force is transmitted from the main transmission output shaft 512 to the traveling relay shaft 535 via the main transmission reverse gear 517 and the backward traveling gear 542, and the driving force is transmitted from the traveling relay shaft 535 to the traveling transmission shaft 536.

Which one of the forward traveling low speed clutch 537 and the forward traveling high speed clutch 539 transitions to the driving force connected state due to the forward traveling side operation on the forward and backward travel switching lever 36 is determined in accordance with an amount of operation on the main transmission lever 50. When the forward and backward travel switching lever 36 is at the neutral position, all the hydraulic clutches 537, 539, and 541 are in a driving force disconnected state, and the traveling driving force from the main transmission output shaft 512 is substantially zero (main clutch disengaged state).

Figure 23:
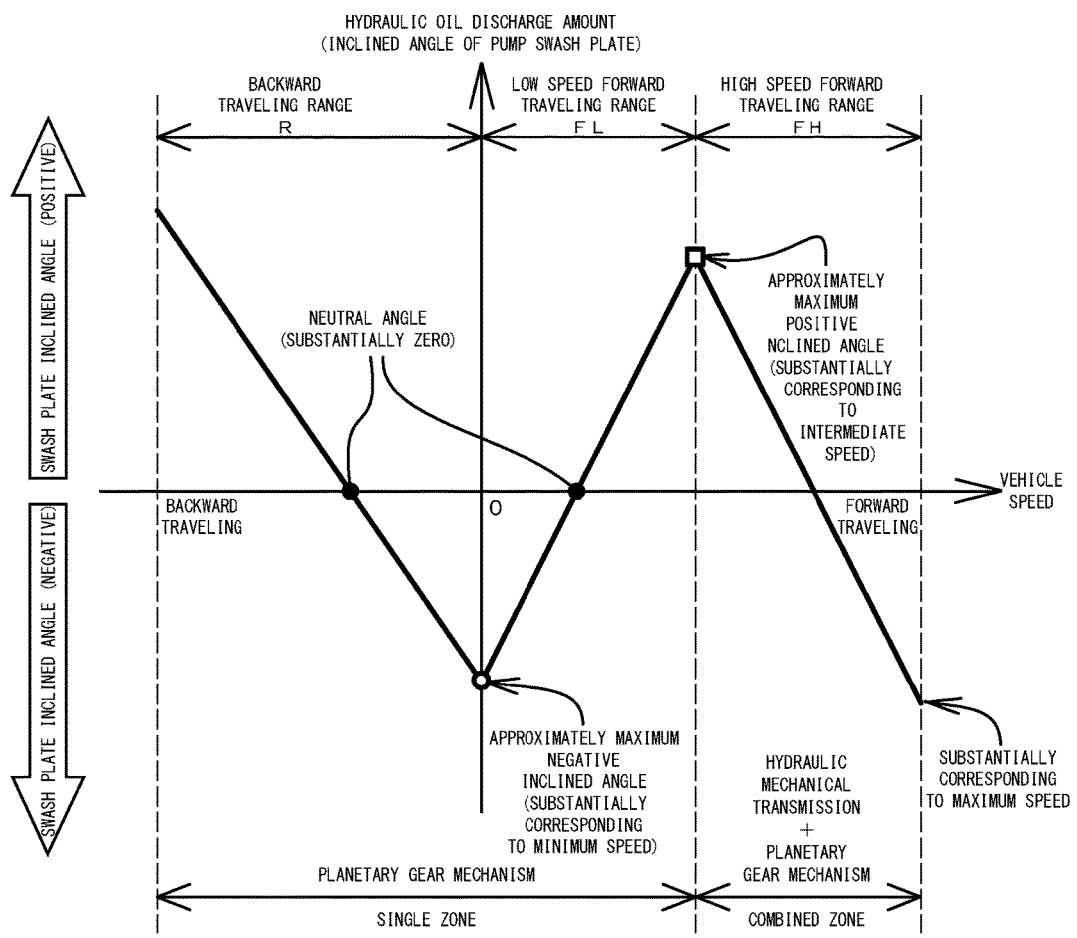
FIG. 23 is a diagram illustrating a relationship between a hydraulic oil discharge amount of the hydraulic mechanical transmission and a vehicle speed.

FIG. 23 illustrates a relationship between the hydraulic oil discharge amount (the inclined angle of the pump swash plate 523) of the hydraulic mechanical transmission 500 and vehicle speed of the tractor 1. In the embodiment, when the main transmission lever 50 is operated to be neutral, the main transmission hydraulic cylinder 524 is driven in such a manner that the inclined angle of the pump swash plate 523 becomes close to the negative maximum inclined angle (reverse inclined angle) (see the outline circle mark in FIG. 23), regardless of the operation state of the forward and backward travel switching lever 36. Thus, the main transmission output shaft 512 and the traveling relay shaft 535 rotates at the minimum speed (substantially zero), whereby the vehicle speed of the tractor 1 drops to substantially zero.

When the main transmission lever 50 is operated toward an accelerating side from neutral to an approximately intermediate speed with the forward and backward travel switching lever 36 operated toward the forward traveling side, the main transmission hydraulic cylinder 524 is driven in such a manner that the inclined angle of the pump swash plate 523 transitions from the approximately negative maximum inclined angle (reverse inclined angle) to zero and to the approximately maximum positive inclined angle (normal inclined angle) (see the outline square mark). Thus, the shifted driving force from the fixed capacity hydraulic motor unit 522 to the main transmission output shaft 512 increases from substantially zero to a high speed. In this process, the driving force connected state of the forward traveling low speed clutch 537 is achieved, and the forward traveling low speed gear 538 or the front traveling high speed gear 540 is coupled to the traveling relay shaft 535 in a relatively non-rotatable manner. As a result, the rotational driving force for low speed forward traveling is transmitted from the main transmission output shaft 512 to the traveling relay shaft 535 via the pair of low speed gears 525. Thus, the driving force for increasing the speed is transmitted to the main transmission output shaft 512, whereby the traveling relay shaft 535 transmissions from a minimum rotation speed traveling state to a forward intermediate rotation speed traveling state (see a low speed forward traveling range FL). Then, the driving force is transmitted from the traveling relay shaft 535 to the traveling transmission shaft 536.

When the main transmission lever 50 is operated toward the accelerating side from the intermediate speed to an approximately maximum speed with the forward and backward travel switching lever 36 operated toward the forward traveling side, the main transmission hydraulic cylinder 524 is driven in such a manner that the inclined angle of the pump swash plate 523 transitions from the approximately positive maximum inclined angle (normal inclined angle) to zero and to the approximately maximum negative inclined angle (reverse inclined angle). Thus, the pump swash plate 523 causes the shifted driving force from the fixed capacity hydraulic motor unit 522 to the main transmission output shaft 512 to drop from a high speed to substantially zero. In this process, the driving force connected state of the forward traveling high speed clutch 539 is achieved, and the front traveling high speed gear 540 is coupled to the traveling relay shaft 535 in a relatively non-rotatable manner. As a result, the rotational driving force for high speed forward traveling is transmitted from the main transmission output shaft 512 to the traveling relay shaft 535 via the planetary gear mechanism 526. Thus, in the planetary gear mechanism 526, the driving force from the engine 5 and the decelerating driving force to the main transmission output shaft 512 are combined, and the resultant combined driving force causes the traveling relay shaft 535 to transition from the intermediate rotation speed forward traveling state to a maximum rotation speed forward traveling state (see a forward high speed traveling range FH). Then, the driving force is transmitted from the traveling relay shaft 535 to the traveling transmission shaft 536, and the maximum traveling speed of the traveling machine body 2 is achieved.

When the main transmission lever 50 is operated toward the accelerating side from the intermediate speed with the forward and backward travel switching lever 36 operated toward the backward traveling side, the main transmission hydraulic cylinder 524 is driven in such a manner that the inclined angle of the pump swash plate 523 transitions from the approximately negative maximum inclined angle (reverse inclined angle) to zero and to the approximately maximum positive inclined angle (normal inclined angle). Thus, the shifted driving force from the fixed capacity hydraulic motor unit 522 to the main transmission output shaft 512 increases from substantially zero to a high speed. In this process, the driving force connected state of the backward traveling hydraulic clutch 541 is achieved, and the backward traveling gear 542 is coupled to the traveling relay shaft 535 in a relatively non-rotatable manner. As a result, the rotational driving force for backward traveling is transmitted from the main transmission output shaft 512 to the traveling relay shaft 535 via the main transmission reverse gear 517 and the backward traveling gear 542. Thus, increased driving speed is transmitted to the main transmission output shaft 512, whereby the traveling relay shaft 535 transitions from the minimum rotation state to a backward higher speed rotation state (see a backward traveling range R). Then, the driving force is transmitted from the traveling relay shaft 535 to the traveling transmission shaft 536.

Figure 13:
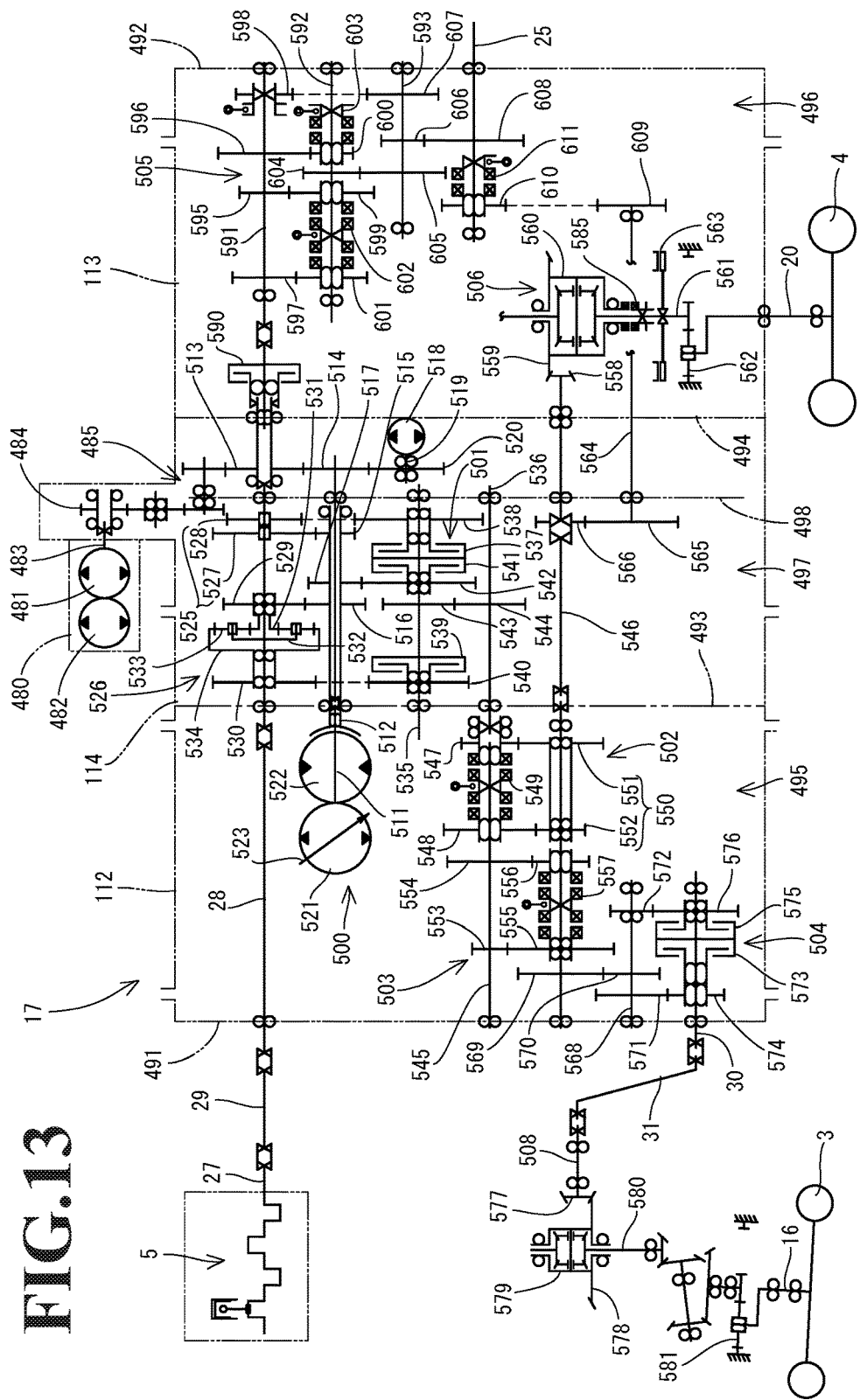
FIG. 13 a skeleton diagram illustrating a driving force transmission system of the tractor.
Figure 14:
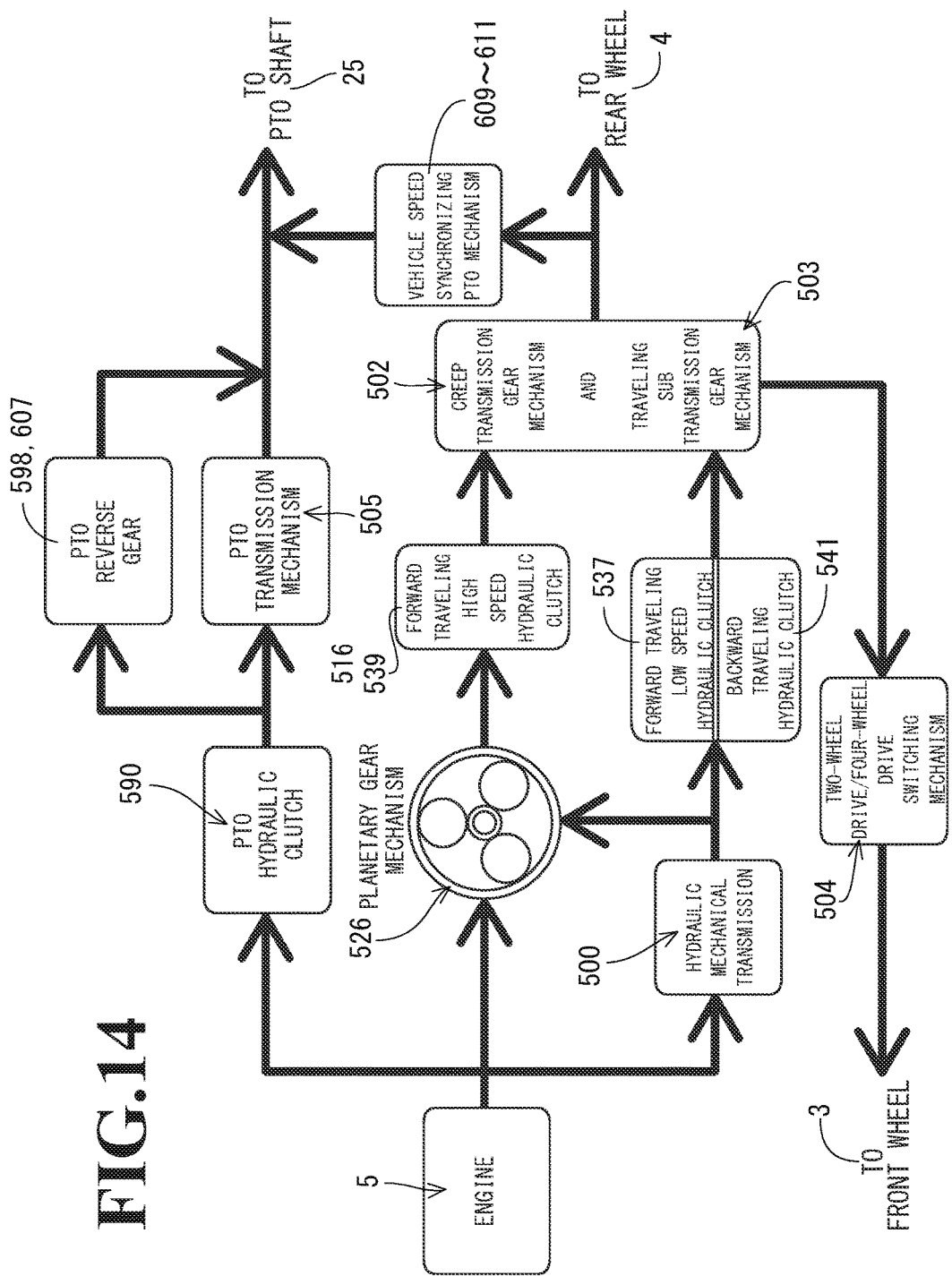
FIG. 14 is a diagram illustrating a simplified version of a driving force transmission system of the tractor.
Figure 15:
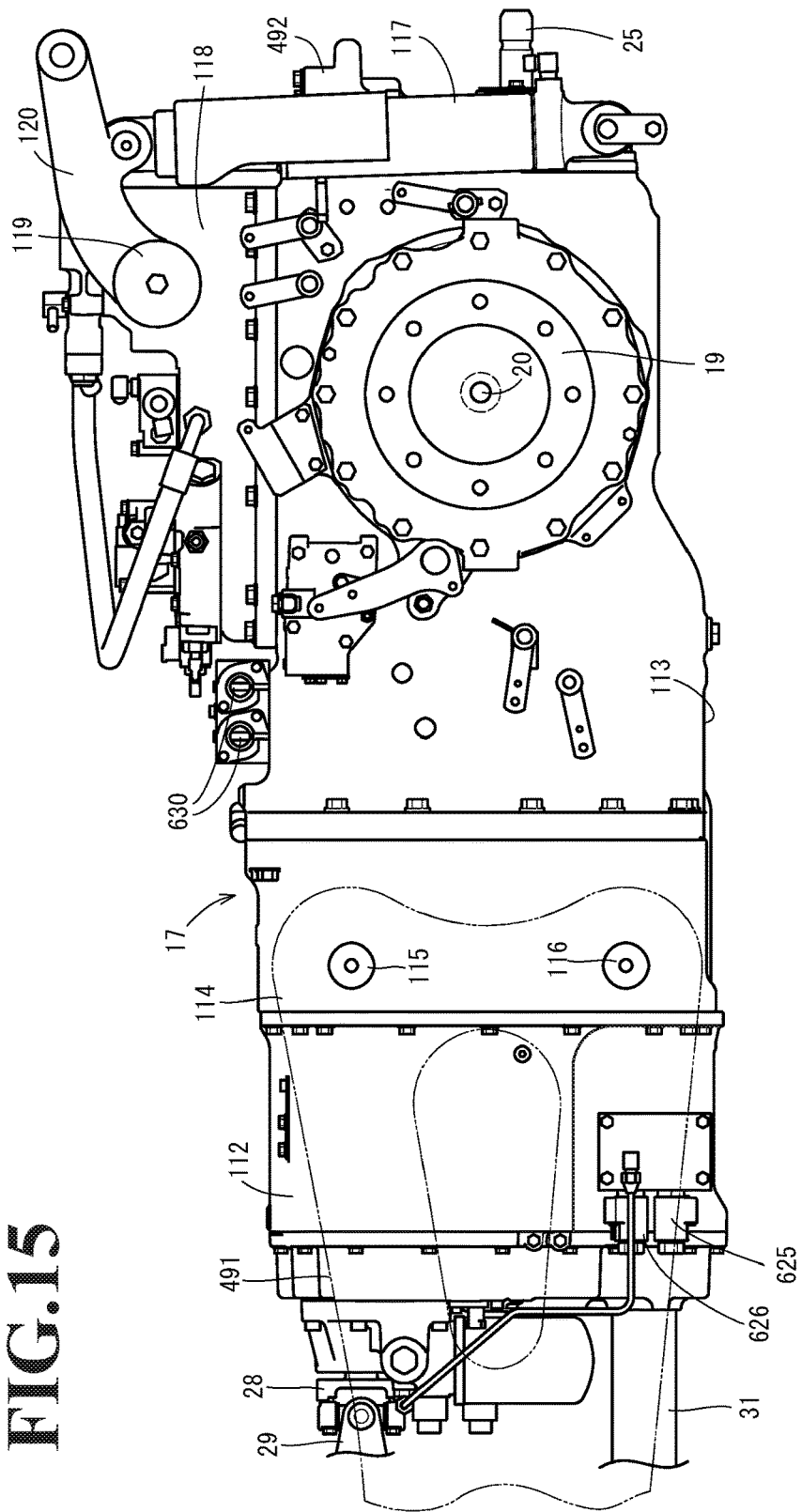
FIG. 15 is a left side view of a transmission case.
Figure 16:
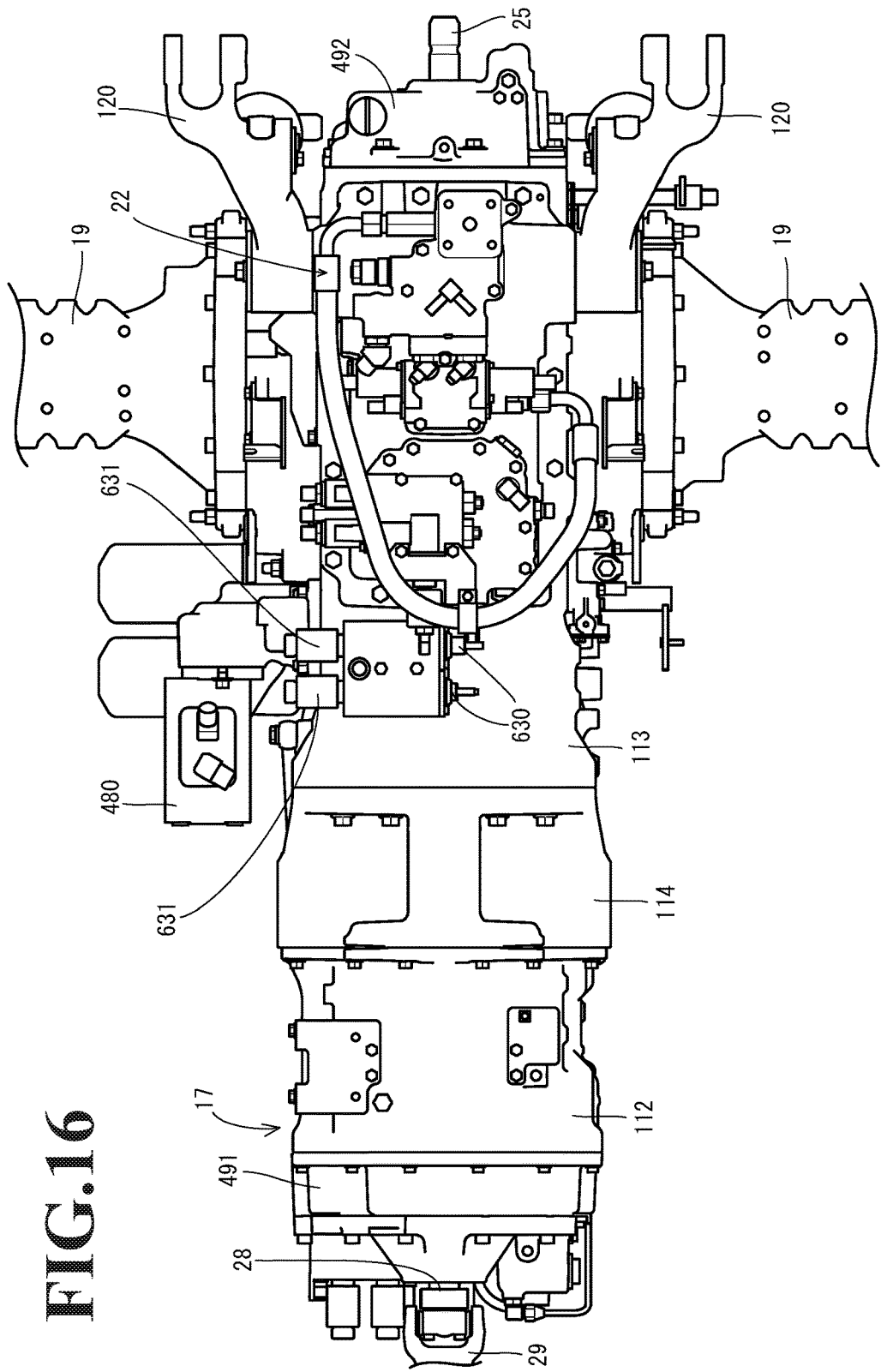
FIG. 16 is a plan view of the transmission case.
Figure 17:
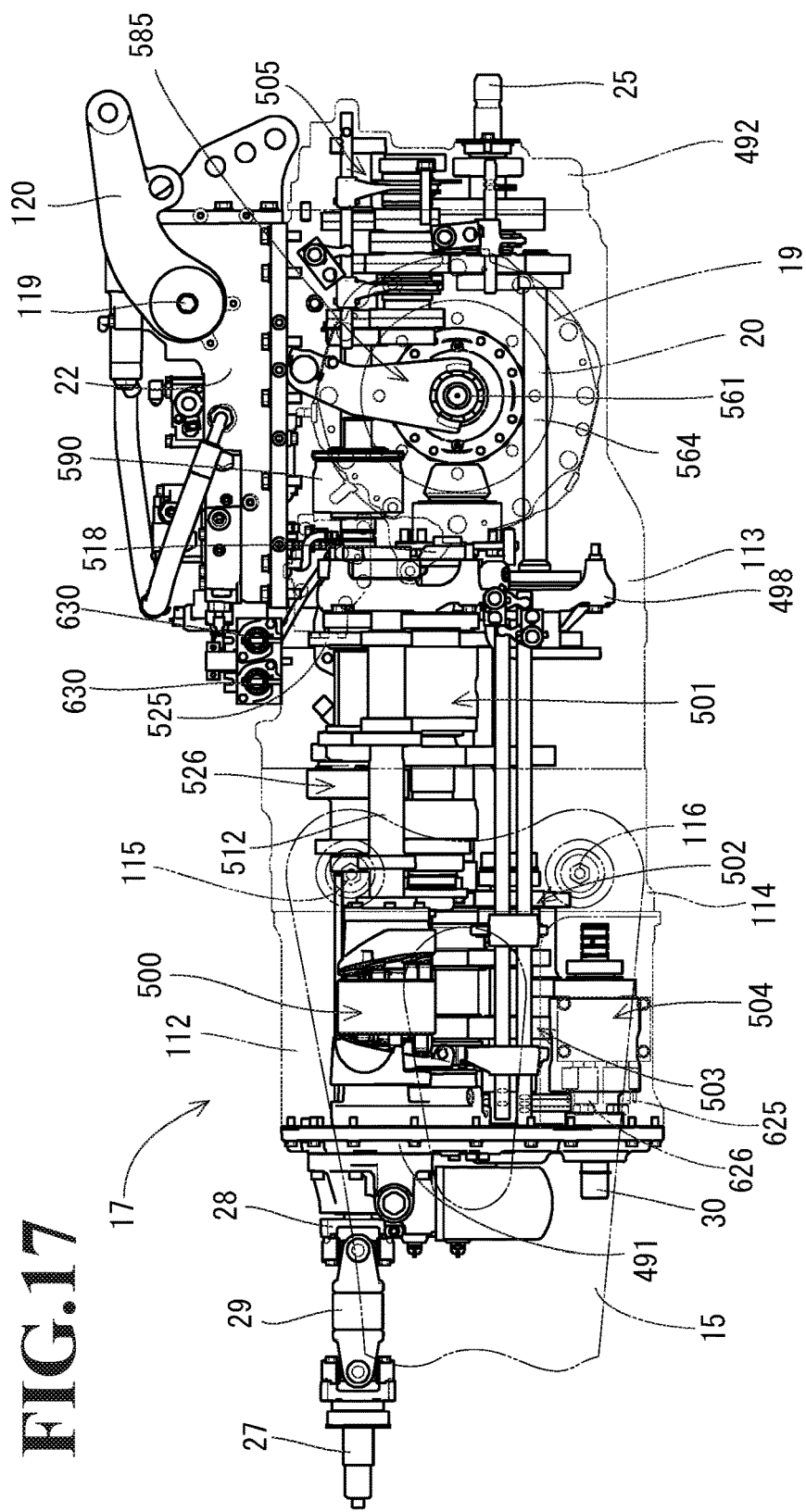
FIG. 17 is a left side view illustrating an internal structure of a transmission case.
Figure 18:
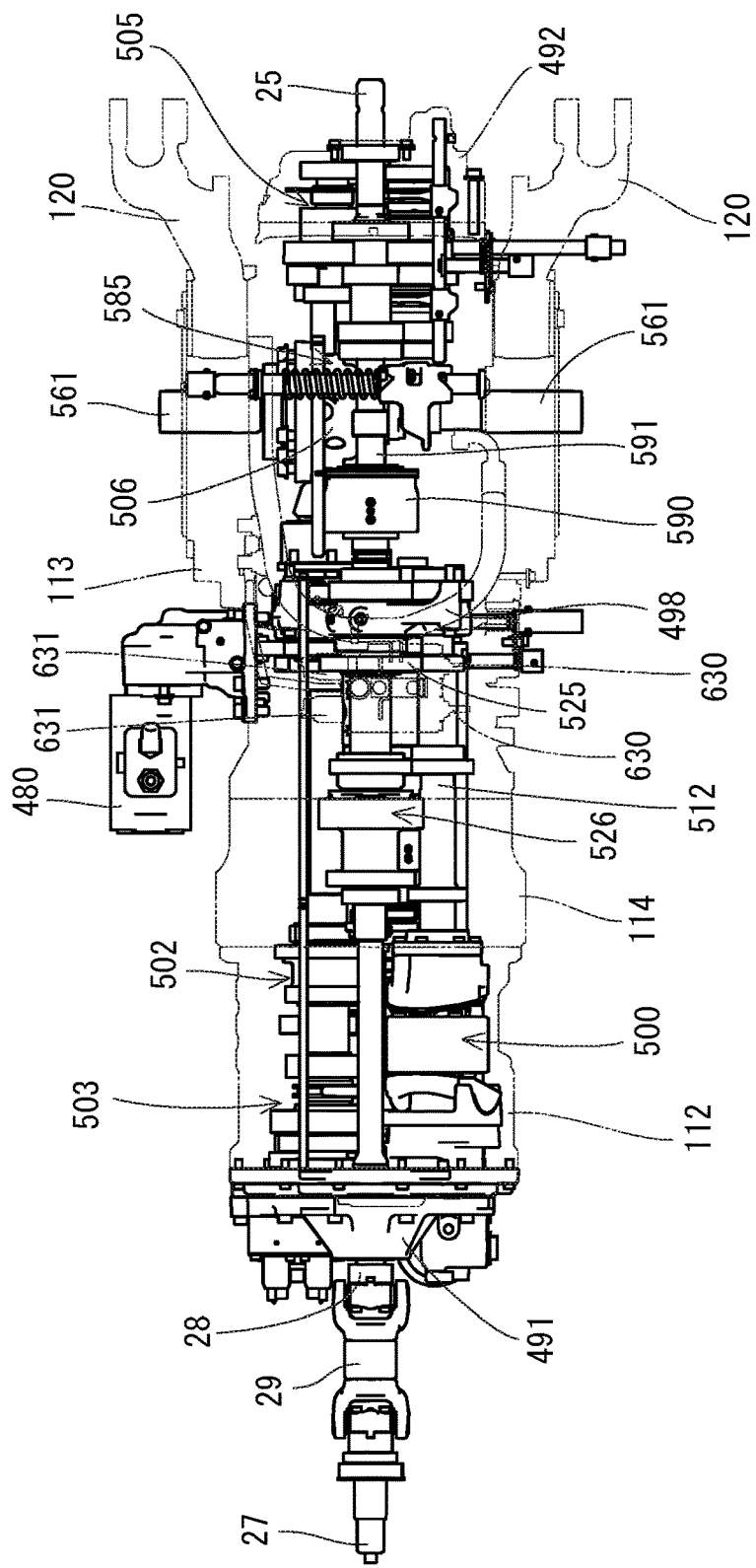
FIG. 18 is a plan view illustrating the internal structure of the transmission case.
Figure 19:
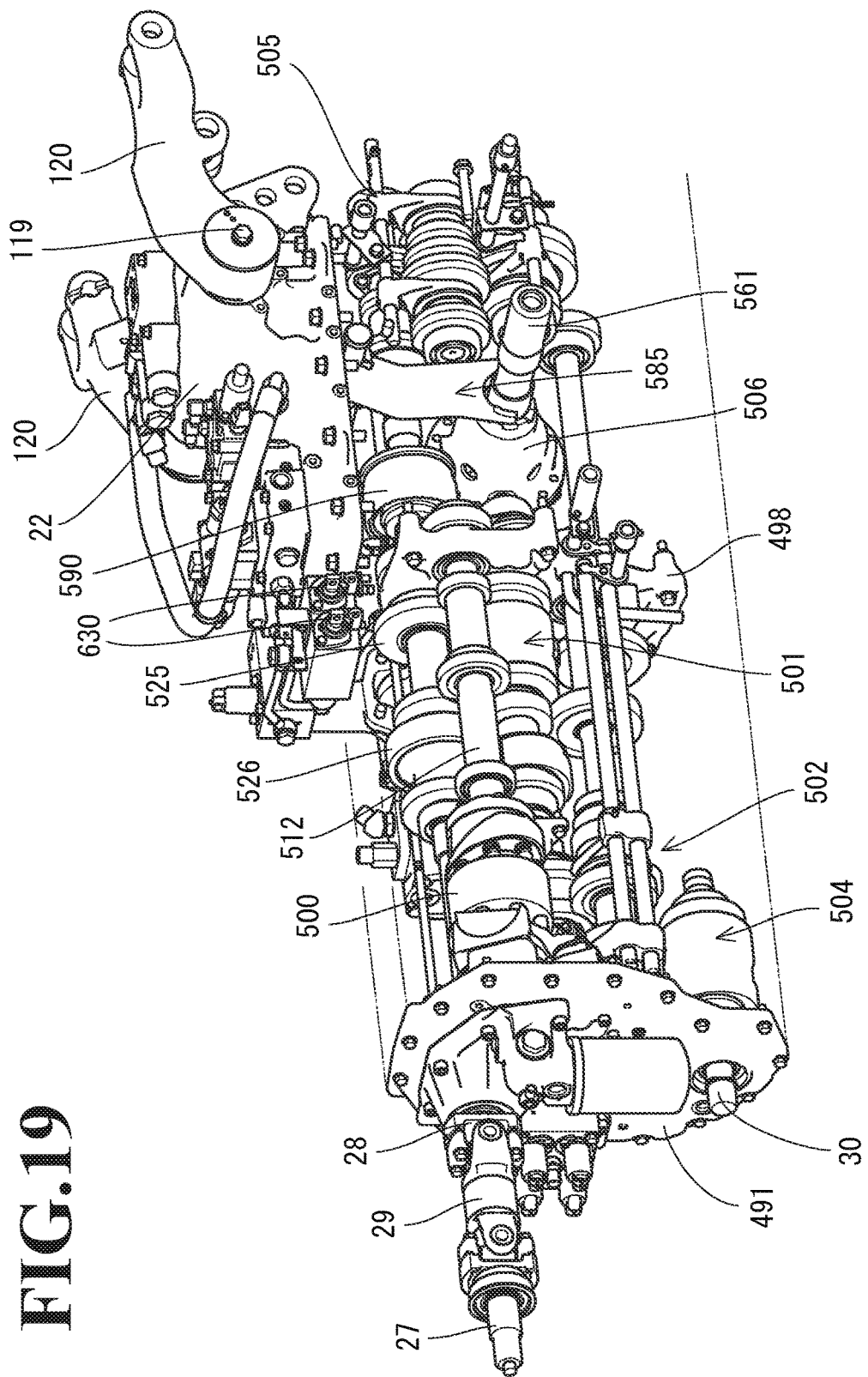
FIG. 19 is a perspective view illustrating the internal structure of the transmission case.

As is apparent from the above description and FIG. 13, FIG. 14, FIG. 23, and the like, a work vehicle includes the transmission case 17, installed in the traveling machine body 2, having: the main transmission input shaft 511 to which the driving force is transmitted from the engine 5; and the main transmission output shaft 512 fit on the main transmission input shaft 511 in a relatively rotatable manner. The main transmission input shaft 511 is provided with the hydraulic pump unit 521, the cylinder block 800, and the fixed capacity hydraulic motor unit 522, forming the hydraulic mechanical transmission 500, arranged in series. The shifted driving force is transmitted to the main transmission output shaft 512 via the fixed capacity hydraulic motor unit 522. The transmission case 17 includes: the planetary gear mechanism 526 in which the driving force from the engine 5 and the shifted driving force to the main transmission output shaft 512 are combined; and the traveling relay shaft 535 with which the shifted driving force via the main transmission output shaft 512 and the combined driving force via the planetary gear mechanism 526 can be transmitted. Thus, a large shiftable range can be achieved by using the planetary gear mechanism 526 without increasing the capacity of the hydraulic mechanical transmission 500. Thus, a higher output of the transmission case 17 including the hydraulic mechanical transmission 500 can be achieved with the high efficiency, light weight, and low cost of the hydraulic mechanical transmission 500 guaranteed.

In the embodiment, the swash plate inclined angle of the hydraulic pump unit 521 is changed from a normal inclined angle to zero and to a reverse inclined angle and the shifted driving force to the main transmission output shaft 512 is reduced from a high speed to zero. The driving force from the engine 5 and the decelerating driving force to the main transmission output shaft 512 are combined in the planetary gear mechanism 526, and the combined driving force causes the traveling relay shaft 535 to transition from the intermediate rotation speed forward traveling state to the maximum rotation speed forward traveling state. Thus, a large shiftable range can be guaranteed by using the planetary gear mechanism 526 without increasing the capacity of the hydraulic mechanical transmission 500. Thus, a higher output of the transmission case 17 can be achieved while further achieving the high efficiency, light weight, and low cost of the hydraulic mechanical transmission 500.

Furthermore, in the embodiment, the wash plate inclined angle of the hydraulic pump unit 521 is changed from the reverse inclined angle via zero to a normal inclined angle and the shifted driving force to the main transmission output shaft 512 is increased from zero to a high speed. The increased driving force to the main transmission output shaft 512 causes the traveling relay shaft 535 to transition from the minimum rotation speed state to the intermediate rotation speed forward traveling state. Thus, an output torque for causing the zero start of the tractor 1 from a state where the initial speed is zero can be guaranteed. All things considered, creeping speed performance of the tractor 1 can be improved with a higher output of the transmission case 17 achieved while further achieving the high efficiency, light weight, and low cost of the hydraulic mechanical transmission 500.

Specifically, in the embodiment, the transmission case 17 includes the input counter shaft 28 with which the driving force from the engine 5 is transmitted to the main transmission input shaft 511. The input counter shaft 28, the main transmission input shaft 511, the main transmission output shaft 512, and the traveling relay shaft 535 are arranged in parallel with each other. The input counter shaft 28 is provided with the planetary gear mechanism 526. The traveling relay shaft 535 is provided with the forward traveling low speed clutch 537 and the forward traveling high speed clutch 539. Thus, the hydraulic mechanical transmission 500, the planetary gear mechanism 526, the forward traveling low speed clutch 537, and the forward traveling high speed clutch 539 (the forward/backward traveling switching mechanism 501) can be arranged in a compact manner to facilitate an attempt to achieve the transmission case 17 with a compact structure.

Next, a structure of switching among ultra-low speed, low speed, and high speed via the creep transmission gear mechanism 502 and the traveling sub transmission gear mechanism 503 as the traveling transmission gear mechanism will be described. The mechanical creep transmission gear mechanism 502 and the traveling sub transmission gear mechanism 503, for shifting the rotational driving force transmitted via the forward/backward traveling switching mechanism 501, are disposed in the front chamber 495 of the transmission case (in the front transmission case 112). In this configuration, a traveling counter shaft 545, coaxially extending with the traveling transmission shaft 536, is disposed in the front chamber 495 (in the front transmission case 112). A sub transmission shaft 546 extends from the front transmission case 112 to the rear transmission case 113 (from the front chamber 495 to the rear chamber 496 via the intermediate chamber 497) while being in parallel with the traveling counter shaft 545. The traveling counter shaft 545 has the front end side rotatably supported by the front lid member 491. The traveling counter shaft 545 has the rear end side rotatably supported by the intermediate partitioning wall 493. The sub transmission shaft 546 has the front end side rotatably supported by the front lid member 491. The sub transmission shaft 546 has an intermediate portion, in the front and rear direction, rotatably supported by the intermediate partitioning wall 493. The sub transmission shaft 546 has the rear end side rotatably supported by the intermediate supporting plate 498 and the rear partitioning wall 494.

The traveling counter shaft 545 has a rear side provided with a transmission gear 547 and a creep gear 548. The transmission gear 547 is rotatably fit on the traveling counter shaft 545, and is rotatably supported by the intermediate partitioning wall 493 while being coupled to the traveling transmission shaft 536 in an integrally rotating manner. The creep gear 548 is fit on the traveling counter shaft 545 in a relatively non-rotatable manner. A creep shifter 549 is spline fit to a portion of the traveling counter shaft 545 between the transmission gear 547 and the creep gear 548, in such a manner as to be relatively non-rotatable and slidable in an axial direction. When the ultra-low speed lever 44 operated to turn ON and OFF, the creep shifter 549 slides in such a manner that the transmission gear 547 or the creep gear 548 is selectively coupled to the traveling counter shaft 545. A pair of reduction gears 550 are rotatably fit on a portion of the sub transmission shaft 546 inside the front chamber 495 (front transmission case 112). The pair of reduction gears 550 include an input side reduction gear 551 and an output side reduction gear 552 that form an integrated structure. The transmission gear 547 of the traveling counter shaft 545 is constantly in mesh with the input side reduction gear 551 of the sub transmission shaft 546, and the creep gear 548 is constantly in mesh with the output side reduction gear 552.

The traveling counter shaft 545 has a front side provided with a low speed relay gear 553 and a high speed relay gear 554. The low speed relay gear 553 is fixed to the traveling counter shaft 545. The high speed relay gear 554 is fit on the traveling counter shaft 545 in a relatively non-rotatable manner. A low speed gear 555 and a high speed gear 556 are rotatably fit on a portion of the sub transmission shaft 546 further toward the front side than the pair of reduction gears 550. The low speed gear 555 meshes with the low speed relay gear 553. The high speed gear 556 meshes with the high speed relay gear 554. A sub transmission shifter 557 is spline fit to a portion of the sub transmission shaft 546 between the low speed gear 555 and the high speed gear 556 in such a manner as to be relatively non-rotatable and slidable in the axial direction. When the sub transmission lever 45 is operated, the sub transmission shifter 557 slides in such a manner that the low speed gear 555 or the high speed gear 556 is selectively coupled to the sub transmission shaft 546.

In the embodiment, when the ultra-low speed lever 44 is operated to turn ON and the sub transmission lever 45 is operated to be on the low speed side, the creep gear 548 is coupled to the traveling counter shaft 545 in a relatively non-rotatable manner, and the low speed gear 555 is coupled to the sub transmission shaft 546 in a relatively non-rotatable manner. Thus, the ultra-low speed traveling driving force is output to the front wheels 3 and/or the rear wheels 4 from the traveling transmission shaft 536 via the traveling counter shaft 545 and the sub transmission shaft 546. The ultra-low speed lever 44 and the sub transmission lever 45 are coupled to each other in an interlocking manner via a restraining member (details of which will be described later) so that the operation to move the sub transmission lever 45 toward the high speed side and the operation to turn ON the ultra-low speed lever 44 cannot be performed at the same time. More specifically, the sub transmission lever 45 cannot be operated to be on the high speed side when the ultra-low speed lever 44 is in the state of being operated to turn ON, and the ultra-low speed lever 44 cannot be operated to turn ON when the sub transmission lever 45 is in the state of being operated to be on the high speed side.

When the ultra-low speed lever 44 is operated to turn OFF and the sub transmission lever 45 is operated to be on the low speed side, the transmission gear 547 is coupled to the traveling counter shaft 545 in a relatively non-rotatable manner and the low speed gear 555 is coupled to the sub transmission shaft 546 in a relatively non-rotatable manner. Thus, low speed traveling driving force is output from the traveling transmission shaft 536 to the front wheels 3 and/or the rear wheels 4 via the traveling counter shaft 545 and the sub transmission shaft 546. When the ultra-low speed lever 44 is operated to turn OFF and the sub transmission lever 45 is operated to be on the high speed side, the transmission gear 547 is coupled to the traveling counter shaft 545 in a relatively non-rotatable manner and the high speed gear 556 is coupled to the sub transmission shaft 546 in a relatively non-rotatable manner. Thus, the high speed traveling driving force is output from the traveling transmission shaft 536 to the front wheels 3 and/or the rear wheels 4 via the traveling counter shaft 545 and the sub transmission shaft 546.

The sub transmission shaft 546 has a rear end side extending through the rear partitioning wall 494 and into the rear chamber 496. The sub transmission shaft 546 has a rear end portion provided with a pinion 558. The rear wheel differential gear mechanism 506, which transmits the traveling driving force to the left and right rear wheels 4, is disposed in the rear chamber 496 (inside the rear portion of the rear transmission case 113). The rear wheel differential gear mechanism 506 includes: a ring gear 559 that meshes with the pinion 558 of the sub transmission shaft 546; a differential gear case 560 provided to the ring gear 559; and a pair of differential output shafts 561 extending in the left and right direction. The differential output shafts 561 are coupled to the rear axles 20 via a final gear 562 and the like. The rear wheels 4 are attached on the distal end side of the rear axle 20.

The left and right differential output shafts 561 are each provided with a brake mechanism 563. The brake mechanism 563 puts a brake on the left and right rear wheels 4 with two systems corresponding to operating and automatic controlling of the brake pedal 35 and the parking brake lever 43. Specifically, each brake mechanism 563 is configured to put a brake on the corresponding differential output shaft 561 and the rear wheel 4 in accordance with a depressing operation on the brake pedal 35 and an operation to pull up the parking brake lever 43. When a steering angle of the steering wheel 9 reaches or exceeds a predetermined angle, a brake cylinder 630 (see FIG. 24) is operated in accordance with a switching operation of an auto brake solenoid valve 631 (see FIG. 24) for one of the rear wheels 4 on the inner side of the turning vehicle (what is known as an auto brake). Thus, the brake mechanism 563 for the one of the rear wheels 4 on the inner side of the turning vehicle is automatically operated for braking. Thus, the tractor 1 can easily make a small turn such as U turn (turning the direction at the headland of the farm field).

The rear wheel differential gear mechanism 506 is provided with a diff-lock mechanism 585 for stopping a differential operation of the rear wheel differential gear mechanism 506 (for constantly driving the left and right differential output shafts 561 at the same speed). When a diff-lock member 753 (details of which will be described later) in the diff-lock mechanism 585 is engaged with the differential gear case 560 due to the depressing operation on the diff-lock pedal 47, the differential gear case 560 is fixed to one of the left and right differential output shafts 561 (the left differential output shaft 561 in the embodiment), and the differential function of the differential gear case 560 stops, and the left and right differential output shafts 561 are driven at the same speed.

Next, the structure for switching between the two-wheel drive and the four-wheel drive of the front and the rear wheels 3 and 4 executed via the two-wheel drive/four-wheel drive switching mechanism 504 will be described. The two-wheel drive/four-wheel drive switching mechanism 504 is disposed in the front chamber 495 (front transmission case 112) of the transmission case. In this configuration, a front wheel input shaft 568 and the front wheel output shaft 30, extending in parallel with the traveling counter shaft 545 and the sub transmission shaft 546, are disposed in the front chamber 495 (the front transmission case 112). A driving gear 569 is fit on the front end side of the sub transmission shaft 546 in a relatively non-rotatable manner and is constantly in mesh with a driven gear 570 fit on the front wheel input shaft 568 in a relatively non-rotatable manner. A double speed relay gear 571 and a four-wheel drive relay gear 572 are respectively disposed on both front and rear sides of the driven gear 570 on the front wheel input shaft 568, in a relatively non-rotatable manner.

The front wheel output shaft 30 is provided with the two-wheel drive/four-wheel drive switching mechanism 504. Specifically, a double speed gear 574 and a four-wheel drive gear 576 are fit on the front wheel output shaft 30. The double speed gear 574 is coupled with a wet multi double speed hydraulic clutch 573. The four-wheel drive gear 576 is coupled with a wet multi four-wheel drive hydraulic clutch 575. The double speed relay gear 571 of the front wheel input shaft 568 is constantly in mesh with the double speed gear 574 of the front wheel output shaft 30, and the four-wheel drive relay gear 572 is in mesh with the four-wheel drive gear 576.

When a driving switching switch or a driving switching lever (not illustrated) is operated to be on the four-wheel drive side, the four-wheel drive hydraulic clutch 575 is in the driving force connected state and the front wheel output shaft 30 and the four-wheel drive gear 576 are coupled to each other in a relatively non-rotatable manner. The rotational driving force is transmitted from the sub transmission shaft 546 to the front wheel output shaft 30 via the front wheel input shaft 568 and the four-wheel drive gear 576. As a result, the tractor 1 transitions to a four-wheel drive state in which the rear wheels 4 as well as the front wheels 3 are driven. When the steering angle of the steering wheel 9 reaches or exceeds the predetermined angle due to the U turn operation or the like, the double speed hydraulic clutch 573 transitions to the driving force connected state, and the front wheel output shaft 30 and the double speed gear 574 are coupled to each other in a relatively non-rotatable manner. The rotational driving force is transmitted from the sub transmission shaft 546 to the front wheel output shaft 30 via the front wheel input shaft 568 and the double speed gear 574. As a result, the front wheels 3 are driven at high speed that is about two times as high as the rotation speed of the front wheels 3 corresponding to the rotational driving force from the four-wheel drive gear 576.

The front wheel transmission shaft 508, extending rearward from the front axle casing 13, and the front wheel output shaft 30, protruding forward from the lower portion of the front surface of the transmission case 17 (front lid member 491), are coupled to each other via the front wheel driving shaft 31 for transmitting the driving force to the front wheels 3. The front wheel differential gear mechanism 507 for transmitting traveling driving force to the left and right front wheels 3 is disposed in the front axle casing 13. The front wheel differential gear mechanism 507 includes: a ring gear 578 that meshes with a pinion 577 provided to the front end side of the front wheel transmission shaft 508; a differential gear case 579 provided to the ring gear 578; and a pair of differential output shafts 580 extending in the left and right direction. The differential output shaft 580 is coupled to the front axle 16 via a final gear 581 and the like. The front wheels 3 are attached to the distal end sides of the front axle 16. The front axle casing 13 has an outer side surface provided with a steering hydraulic cylinder 622 (see FIG. 24) for power steering for changing the traveling direction of the front wheels 3 between left and right in accordance with the steering operation on the steering wheel 9.

Figure 20:
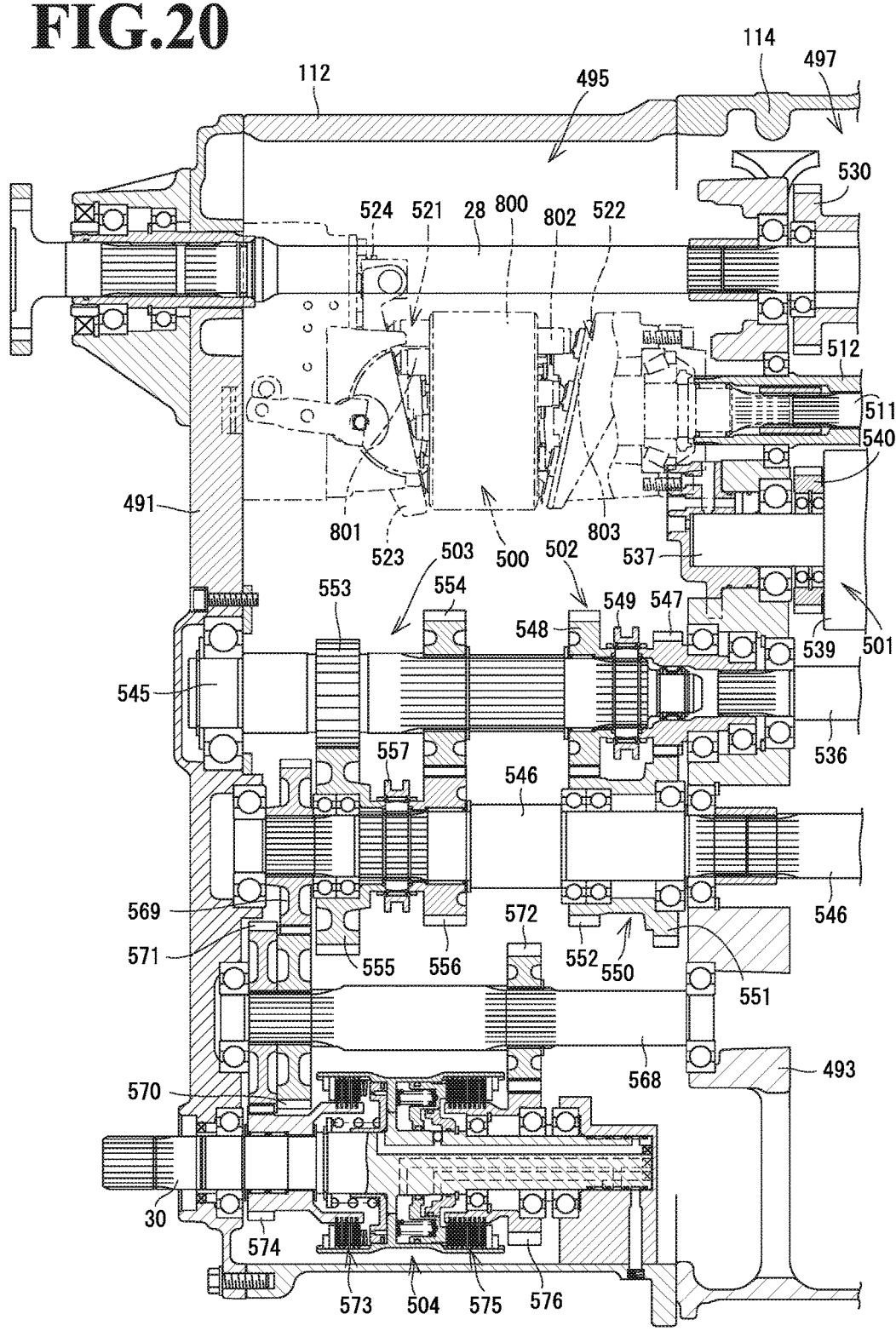
FIG. 20 is a left cross-sectional view illustrating the front portion of the transmission case.
Figure 21:
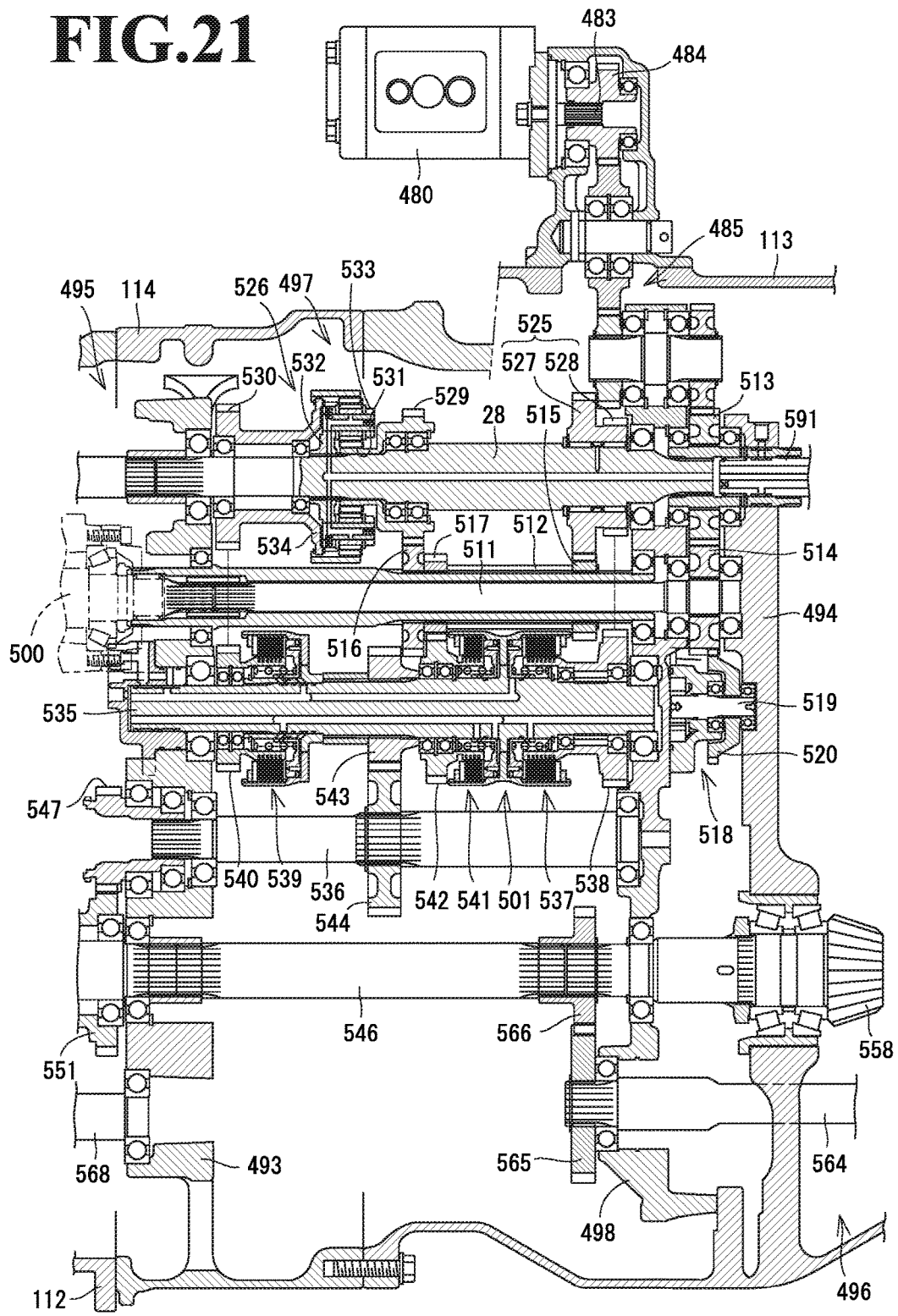
FIG. 21 is a left cross-sectional view illustrating an intermediate portion of the transmission case.
Figure 22:
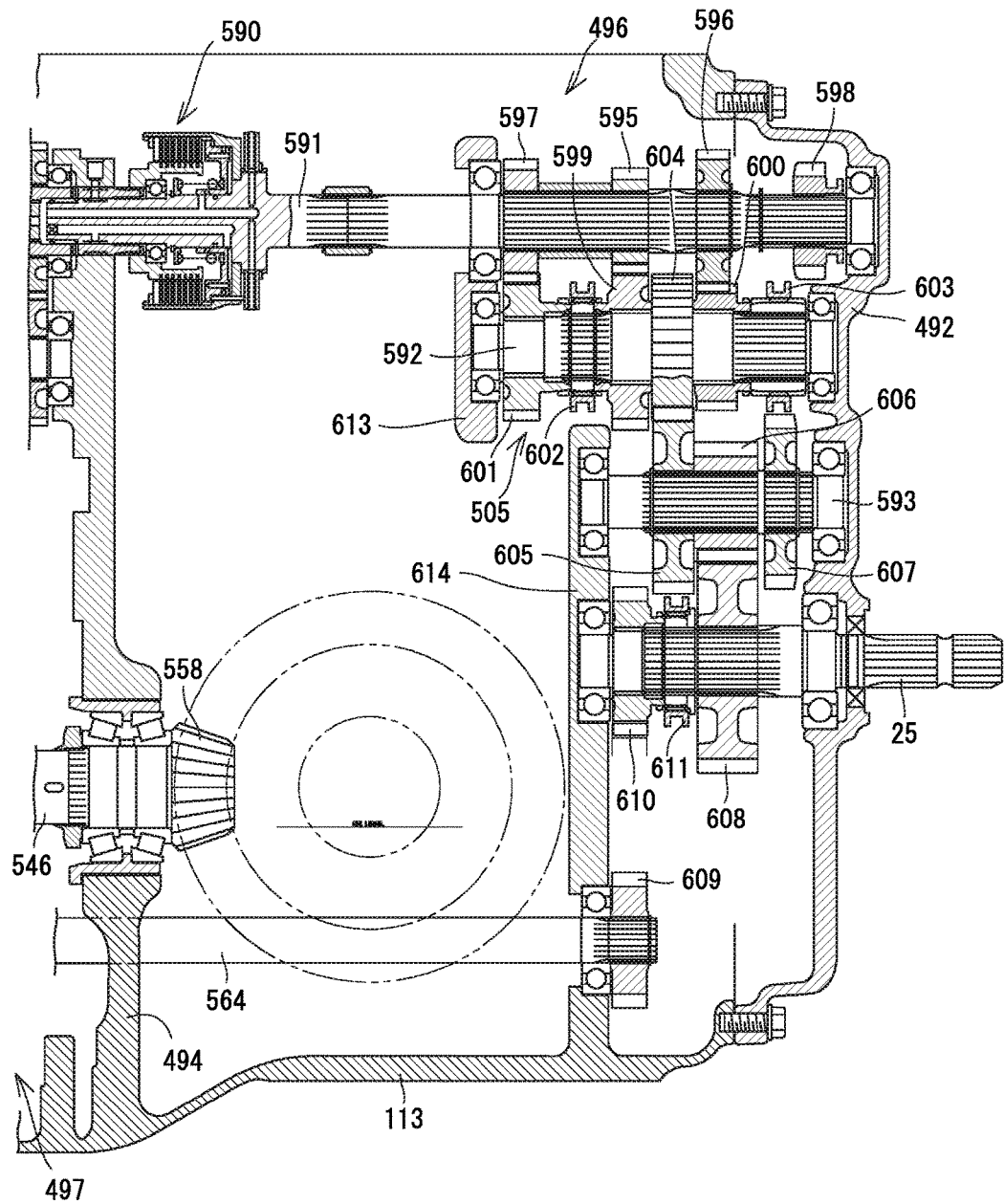
FIG. 22 is a left cross-sectional view of a rear portion of the transmission case.

Next, a structure for the driving speed switching of the PTO shaft 25 (three stages in the normal rotation direction and a single stage in the reverse rotation direction) executed via the PTO transmission mechanism 505 is described. The PTO transmission mechanism 505 for transmitting the driving force from the engine 5 to the PTO shaft 25 is disposed in the rear chamber 496 of the transmission case 17 (rear portion in the rear transmission case 113). In this configuration, a PTO input shaft 591 is coupled to the rear end side of the input counter shaft 28 via a PTO hydraulic clutch 590 for enabling/disabling the transmission of the driving force. The PTO input shaft 591 coaxially extends with the input counter shaft 28. The PTO input shaft 591 is disposed in the rear chamber 496. In this configuration, the PTO input shaft 591 has a front end side rotatably supported by the rear partitioning wall 494. As illustrated in FIG. 20, upper and lower supporting walls 613 and 614, which divide the rear chamber 496 into front and rear portions, are integrally formed in the rear chamber 496. The PTO input shaft 591 has an intermediate portion in the front and rear direction rotatably supported by the upper supporting wall 613 in the rear chamber 496. The PTO input shaft 591 has a rear end side rotatably supported on the inner surface side of the rear lid member 492.

The PTO shifting shaft 592, the PTO counter shaft 593, and the PTO shaft 25 extending in parallel with the PTO input shaft 591 are disposed in the rear chamber 496. The PTO shifting shaft 592 has a front end side rotatably supported by the upper supporting wall 613. The PTO shifting shaft 592 has a rear end side rotatably supported on the inner surface side of the rear lid member 492. The PTO counter shaft 593 has a front end side rotatably supported by the lower supporting wall 614. The PTO counter shaft 593 has a rear end side rotatably supported on the inner surface side of the rear lid member 492. The PTO shaft 25 extends rearward from the rear lid member 492. The PTO shaft 25 has a front end side rotatably supported by the lower supporting wall 614.

When the PTO clutch switch 53 is operated for transmitting driving force, the PTO hydraulic clutch 590 transitions to the driving force connected state, and the input counter shaft 28 and the PTO input shaft 591 are coupled to each other in a relatively non-rotatable manner. As a result, the rotational driving force is transmitted from the input counter shaft 28 to the PTO input shaft 591.

The PTO input shaft 591 is provided with a mid speed input gear 597, a low speed input gear 595, a high speed input gear 596, and a reversing shifter gear 598, in this order from the front side. The mid speed input gear 597, the low speed input gear 595, and the high speed input gear 596 fit on the PTO input shaft 591 in a relatively non-rotatable manner. The reversing shifter gear 598 is spline fit to the PTO input shaft 591 in such a manner as to be relatively non-rotatable and slidable in the axial direction.

A PTO mid speed gear 601 that meshes with the mid speed input gear 597, a PTO low speed gear 599 that meshes with the low speed input gear 595, and a PTO high speed gear 600 that meshes with the high speed input gear 596 are rotatably fit on the PTO shifting shaft 592. A pair of front and rear PTO transmission shifters 602 and 603 are spline fit to the PTO shifting shaft 592 in such a manner as to be relatively non-rotatable and to be slidable in the axial direction. The first PTO transmission shifter 602 is disposed between the PTO mid speed gear 601 and the PTO low speed gear 599. The second PTO transmission shifter 603 is disposed further on the rear end side than the PTO high speed gear 600. The pair of front and rear PTO transmission shifters 602 and 603 slides in the axial direction in accordance with the operation on the PTO transmission lever 46. A PTO transmission gear 604 is fixed to a portion of the PTO shifting shaft 592 between the PTO low speed gear 599 and the PTO high speed gear 600.

A PTO counter gear 605, in mesh with the PTO transmission gear 604, a PTO relay gear 606, in mesh with a PTO output gear 608 fit on the PTO shaft 25 in a relatively non-rotatable manner, and a PTO reverse gear 607 are fit on the PTO counter shaft 593 in a relatively non-rotatable manner. When the sub PTO lever 48 is operated to turn ON in a state where the PTO transmission lever 46 is in a state of having been operated to be in neutral, the reversing shifter gear 598 slides to mesh with the PTO reverse gear 607 of the PTO counter shaft 593.

When the PTO transmission lever 46 is operated for shifting, the pair of front and rear PTO transmission shifters 602 and 603 slide along the PTO shifting shaft 592, in such a manner that the PTO low speed gear 595, the PTO mid speed gear 597, or the PTO high speed gear 596 is selectively coupled to the PTO shifting shaft 592. As a result, the PTO shifted output corresponding to any one of low speed, mid speed, and high speed is transmitted from the PTO shifting shaft 592 to the PTO counter shaft 593 via the PTO transmission gear 604 and the PTO counter gear 605, and is further transmitted to the PTO shaft 25 via the PTO relay gear 607 and the PTO output gear 608.

When the sub PTO lever 48 is operated to turn ON, the reversing shifter gear 598 meshes with the PTO reverse gear 607. Thus, the rotational driving force is transmitted from the PTO input shaft 591 to the PTO counter shaft 593 via the reversing shifter gear 598 and the PTO reverse gear 607. Then, the reverse PTO shifted output is transmitted from the PTO counter shaft 593 to the PTO shaft 25 via the PTO relay gear 607 and the PTO output gear 608.

As is apparent from the above description, the PTO transmission mechanism 505 according to the embodiment is disposed more on the rear side than upper and lower supporting wall portions 613 and 614 in the rear chamber 496. The rear wheel differential gear mechanism 506 is disposed more on the forward side than the upper and lower supporting wall portions 613 and 614 in the rear chamber 496. As described above, in the embodiment, the rear wheel differential gear mechanism 506 and the PTO transmission mechanism 505 (PTO transmission system) are separately arranged in a simple and compact manner in the rear chamber 496 of the transmission case 17, whereby the assemblability and maintainability of the transmission case 17 can be improved.

As is apparent from the supporting structure for the shafts 25, 591, 592, and 593 such as the PTO shaft 25, the PTO transmission mechanism 505 can be put into and out from a portion more on the rear side than the upper and lower supporting wall portions 613 and 614 in the rear chamber 496 by detaching the rear lid member 492 that is detachably attached to close a rear surface opening portion of the transmission case 17. When the PTO transmission mechanism 505 is installed in the portion more on the rear side than the upper and lower supporting wall portions 613 and 614 in the rear chamber 496, the PTO transmission mechanism 505 is supported by the upper and lower supporting wall portions 613 and 614 and the rear lid member 492. Thus, the PTO transmission mechanism 505 can be exposed when the rear lid member 492 is detached from the transmission case 17. All things considered, the assemblability/disassemblability of the transmission case 17 and the maintainability of the PTO transmission mechanism 505 can further be improved.

In the embodiment, the PTO input shaft 591 and the PTO shifting shaft 592 are supported with the upper supporting wall portion 613 and the rear lid member 492, and the PTO counter shaft 593 and the PTO shaft 25 are supported by the lower supporting wall portion 614 and the rear lid member 492. The positional relationship among the shafts 25 and 591 to 593 are set in such a manner that the shafts are positioned at apices of a rectangular form in back view, and the PTO output is transmitted from the PTO input shaft 591 at an upper stage to the PTO shaft 25 at a lower stage via the PTO shifting shaft 592 and the PTO counter shaft 593 at middle stages. With this configuration, reaction force from the shafts 25 and 591 to 593, due to increased PTO output, can be canceled out. As a result, the vibration transmitted to the transmission case 17 and the traveling machine body 2 can be reduced.

A vehicle speed synchronizing shaft 564, extending in the front and rear direction and in parallel with the sub transmission shaft 546 from the intermediate chamber 497 to the rear chamber 496, is disposed in the rear transmission case 113. A vehicle speed synchronizing input gear 565 is fit on the front end side of the vehicle speed synchronizing shaft 564 in a relatively non-rotatable manner. The vehicle speed synchronizing input gear 565 is constantly in mesh with a driving force branching gear 566 fit on a portion of the sub transmission shaft 546 inside the intermediate chamber 497 in a relatively non-rotatable manner. A vehicle speed synchronizing output gear 610 is rotatably fit on a portion of the PTO shaft 25 more on the front side than the PTO output gear 608 and is constantly in mesh with a vehicle speed synchronizing relay gear 609 fixed to the rear end portion of the vehicle speed synchronizing shaft 564. A vehicle speed synchronizing shifter 611 is spline fit to a portion of the PTO shaft 25 between the vehicle speed synchronizing output gear 610 and the PTO output gear 608 in such a manner as to be relatively non-rotatable and slidable in the axial direction. When the sub PTO lever 48 is operated to turn ON with the PTO transmission lever 46 operated to be neutral, the vehicle speed synchronizing shifter 611 slides so that the vehicle speed synchronizing output gear 610 is coupled to the PTO shaft 25. As a result, a vehicle speed synchronized output is transmitted from the sub transmission shaft 546 to the PTO shaft 25 via the vehicle speed synchronizing shaft 564.

In the embodiment, the function of the sub PTO lever 48 changes in accordance with the driving mode of the PTO shaft 25. Specifically, in the mode of permitting the PTO shaft 25 to be driven in the reverse direction, the reversing shifter gear 598 slides when the sub PTO lever 48 is manually operated so that the PTO shifted output in the reverse direction is transmitted to the PTO shaft 25. In the mode of performing the vehicle speed synchronized driving of the PTO shaft 25, the vehicle speed synchronizing shifter 611 slides when the sub PTO lever 48 is manually operated so that the PTO shifted output synchronized with the vehicle speed is transmitted to the PTO shaft 25.

In any mode, the PTO transmission lever 46 and the sub PTO lever 48 are coupled to each other in an interlocking manner via a PTO restraining member (described in detail later) in such a manner that the shifting operation to move the PTO transmission lever 46 to a stage other neutral and the operation to turn ON the sub PTO lever 48 cannot both be achieved at the same time. Thus, in a state where the sub PTO lever 48 is operated to turn ON, the shifting operation to move the PTO transmission lever 46 to a stage other than neutral cannot be performed, and in a state where the shifting operation has been performed so that the PTO transmission lever 46 is in a stage other than neutral, the sub PTO lever 48 cannot be operated to turn ON.

Figure 24:
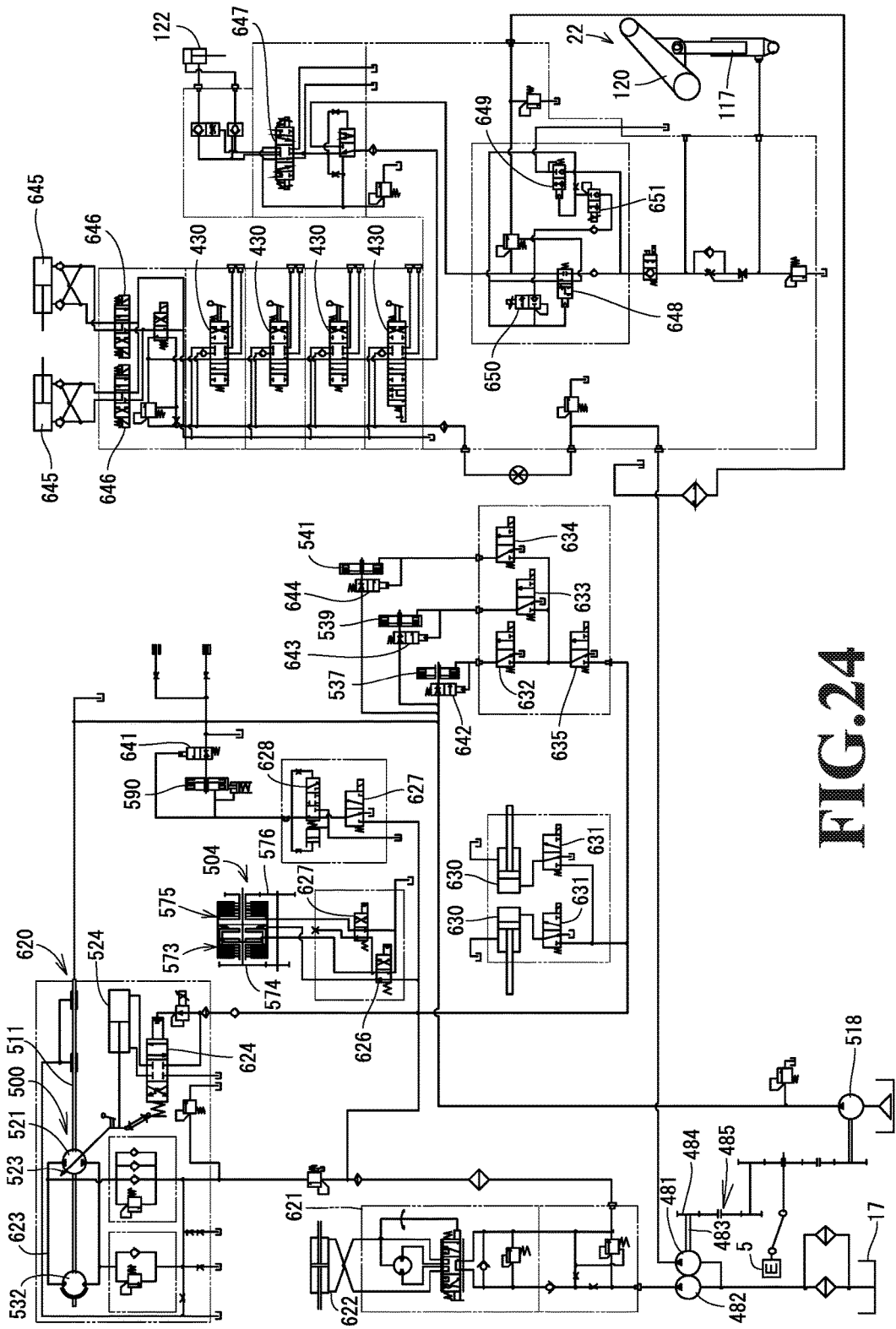
FIG. 24 is a hydraulic circuit diagram of the tractor.

Next, a structure of a hydraulic circuit 620 of the tractor 1 is described with reference to FIG. 24. The hydraulic circuit 620 of the tractor 1 includes the work machine hydraulic pump 481 and the traveling hydraulic pump 482 driven by the rotational driving force from the engine 5. In the embodiment, the transmission case 17 is used as a hydraulic oil tank, and the hydraulic oil in the transmission case 17 is supplied to the work machine hydraulic pump 481 and the traveling hydraulic pump 482. The traveling hydraulic pump 482 is coupled to the steering hydraulic cylinder 622, for power steering by the steering wheel 9, and to a closed loop oil path 623, coupling the hydraulic pump 521 and the hydraulic motor 522 of the hydraulic mechanical transmission 500 to each other, via a power steering hydraulic mechanism 621. While the engine 5 is driving, the hydraulic oil is constantly supplied from the traveling hydraulic pump 482 to the closed loop oil path 623.

The traveling hydraulic pump 482 is coupled to: a main transmission hydraulic switching valve 624 for the main transmission hydraulic cylinder 524 of the hydraulic mechanical transmission 500; a double speed hydraulic switching valve 625 for the double speed hydraulic clutch 573; a four-wheel drive hydraulic switching valve 626 for the four-wheel drive hydraulic clutch 575; a PTO clutch solenoid valve 627 for the PTO hydraulic clutch 590; and a switching valve 628 operated by the PTO clutch solenoid valve 627.

Furthermore, the traveling hydraulic pump 482 is coupled to: left and right auto brake solenoid valves 631 as switching valves each operating a corresponding one of a pair of left and right brake cylinders 630 for auto braking; a forward traveling low speed clutch solenoid valve 632 for operating the forward traveling low speed clutch 537; a forward traveling high speed clutch solenoid valve 633 for operating the forward traveling high speed clutch 539; a backward traveling clutch solenoid valve 634 for operating the backward traveling hydraulic clutch 541; and the master control solenoid valve 635 for controlling supplying of hydraulic oil to the clutch solenoid valve 632 to 634.

The work machine hydraulic pump 481 is coupled to a plurality of the hydraulic output valves 430 stacked on an upper surface of the hydraulic lifting and lowering mechanism 22 on a rear side of the upper surface of the transmission case 17, left and right track adjustment solenoid valves 646 for controlling hydraulic oil supplying to left and right track adjustment hydraulic cylinders 645 for adjusting the track (axle track) between the left and right rear wheels 4, an inclining control solenoid valve 647 for controlling hydraulic oil supplying to the horizontal cylinder 122 provided to the right lift rod 121, a lifting hydraulic switching valve 648 and a lowering hydraulic switching valve 649 for controlling hydraulic oil supplying to the hydraulic lift cylinders 117 in the hydraulic lifting and lowering mechanism 22, a lifting control solenoid valve 650 with which a switching operation for the lifting hydraulic switching valve 648 is performed, and a lowering control solenoid valve 651 for operating the lowering hydraulic switching valve 649.

When the left and right track adjustment solenoid valves 646 are drivingly switched, the left and right track adjustment hydraulic cylinders 645 make a telescopic movement, and thus the left and right rear axle cases 19 make a telescopic movement in the left and right direction. As a result, the tread between the left and right rear wheels 4 increases or decreases. When the inclining control solenoid valve 647 is drivingly switched, the horizontal cylinder 122 makes a telescopic movement, and the right lower link 23 moves upward and downward via a lower link pin on a front side. As a result, the ground work machine inclines left and right with respect to the traveling machine body 2 via the left and right lower links 23, and thus the left and right inclined angle of the ground work machine changes via the left and right lower links 23. When the switching operation is performed on the lifting hydraulic switching valve 648 with the lifting control solenoid valve 650 or performed on the lowering hydraulic switching valve 649 with the lowering control solenoid valve 651, the hydraulic lift cylinder 117 makes a telescopic movement and the lift arm 120 and the left and right lower links 23 move together upward or downward. Thus, the position of the ground work machine in the height direction changes.

The hydraulic circuit 620 of the tractor 1 includes the work machine hydraulic pump 481 and the traveling hydraulic pump 482 as described above, and further includes the lubricant oil pump 518 driven by rotational driving force of the engine 5. The lubricant oil pump 518 is connected to a PTO clutch hydraulic switching valve 641 with which hydraulic oil (lubricant oil) is supplied to a lubricated portion of the PTO hydraulic clutch 590, a forward traveling low speed clutch hydraulic switching valve 642 with which the hydraulic oil (lubricant oil) is supplied to a lubricated portion of the main transmission input shaft 511 that supports the hydraulic mechanical transmission 500 and a lubricated portion of the forward traveling low speed clutch 537, a forward traveling high speed clutch hydraulic switching valve 643 with which the hydraulic oil (lubricant oil) is supplied to a lubricated portion of the forward traveling high speed clutch 539, and a backward clutch hydraulic switching valve 644 with which the hydraulic oil (lubricant oil) is supplied to a lubricated portion of the backward traveling hydraulic clutch 541. The hydraulic circuit 620 includes a relief valve, a flowrate adjustment valve, a check valve, an oil cooler, an oil filter, and the like.

The configuration of the portions in the present invention is not limited to that in the illustrated embodiment, and can be changed in various ways without departing from the gist of the present invention.

What is claimed is:

1. A work vehicle comprising a transmission case, installed in a traveling machine body, that includes:
    a main transmission input shaft configured to receive a driving force transmitted from an engine;
    a main transmission output shaft fit on the main transmission input shaft in a relatively rotatable manner,
    wherein the main transmission input shaft is provided with a hydraulic pump unit, a cylinder block, and a hydraulic motor unit, forming a hydraulic mechanical transmission and being arranged in series, wherein the hydraulic motor unit is configured to transmit shifted driving force to the main transmission output shaft, and
    wherein the transmission case includes:
        a planetary gear mechanism configured to combine the driving force from the engine and the shifted driving force to the main transmission output shaft to generate a combined driving force;
        a transmission shaft configured to receive the shifted driving force via the main transmission output shaft and the combined driving force via the planetary gear mechanism;
        a forward traveling low speed clutch configured to connect and disconnect transmission of the driving force from the main transmission output shaft to the transmission shaft; and
        a forward traveling high speed clutch configured to connect and disconnect transmission of the driving force from the planetary gear mechanism to the transmission shaft, wherein:
    the transmission case further includes an input counter shaft through which the driving force form the engine is transmitted to the main transmission input shaft,
    the input counter shaft, the main transmission input shaft, the main transmission output shaft, and the transmission shaft are arranged in parallel with each other,
    the input counter shaft is provided with the planetary gear mechanism, and
    the transmission shaft is provided with the forward traveling low speed clutch and the forward traveling high speed clutch.

2. The work vehicle according to claim 1, wherein:
    a swash plate inclined angle of the hydraulic pump unit is configured to be changed from a normal inclined angle via zero to a reverse inclined angle to reduce the shifted driving force to the main transmission output shaft from a high speed to zero; and
    in the planetary gear mechanism, the driving force from the engine and the reduced driving force to the main transmission output shaft are combined, and the combined driving force causes the transmission shaft to transition from an intermediate rotation speed forward traveling state to a maximum rotation speed forward traveling state.

3. The work vehicle according to claim 1, wherein:
    a swash plate inclined angle of the hydraulic pump unit is configured to be changed from a reverse inclined angle via zero to a normal inclined angle to increase the shifted driving force to the main transmission output shaft from zero to a high speed; and
    the increased driving force to the main transmission output shaft causes the transmission shaft to transition from a minimum rotation speed traveling state to an intermediate rotation speed forward traveling state.

\* \* \* \* \*